(12) United States Patent
Imaizumi et al.

(10) Patent No.: US 9,525,868 B2
(45) Date of Patent: Dec. 20, 2016

(54) MOBILE TERMINAL APPARATUS WHICH DISPLAYS CAPTURED IMAGES

(71) Applicant: Sharp Kabushiki Kaisha, Osaka (JP)

(72) Inventors: Daisaku Imaizumi, Osaka (JP); Yasushi Adachi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/550,170

(22) Filed: Nov. 21, 2014

(65) Prior Publication Data

US 2015/0146020 A1 May 28, 2015

(30) Foreign Application Priority Data

Nov. 28, 2013 (JP) ................................. 2013-246526

(51) Int. Cl.
*H04N 5/232* (2006.01)
*H04N 19/00* (2014.01)
*G06K 9/22* (2006.01)
*G06K 9/32* (2006.01)

(52) U.S. Cl.
CPC .............. *H04N 19/00* (2013.01); *G06K 9/22* (2013.01); *G06K 9/32* (2013.01); *H04N 5/23229* (2013.01); *H04N 5/23254* (2013.01); *H04N 5/23293* (2013.01)

(58) Field of Classification Search
CPC  H04N 19/00; H04N 5/23229; H04N 5/23254; H04N 5/23293; G06K 9/32; G06K 9/22
USPC ........ 348/14.07, 191, 231.2, 333.01, 333.12, 348/441, 445, E11.021
See application file for complete search history.

(56) References Cited

U.S. PATENT DOCUMENTS

| 6,701,012 | B1 | 3/2004 | Matthews | |
|---|---|---|---|---|
| 8,310,550 | B2 * | 11/2012 | Hayasaki | H04N 1/00307 348/207.2 |
| 2005/0078192 | A1 * | 4/2005 | Sakurai | G06K 9/3283 348/207.99 |
| 2005/0180650 | A1 | 8/2005 | Komagamine | |
| 2010/0253789 | A1 | 10/2010 | Hayasaki | |
| 2015/0093031 | A1 * | 4/2015 | Konishi | G06K 9/00442 382/190 |
| 2016/0105586 | A1 * | 4/2016 | Oki | H04N 1/4105 358/2.1 |

FOREIGN PATENT DOCUMENTS

| JP | 2002-094805 | 3/2002 |
|---|---|---|
| JP | 2005-122320 | 5/2005 |
| JP | 2005-202593 | 7/2005 |
| JP | 2010-245787 A | 10/2010 |
| JP | 2012-74852 A | 4/2012 |

* cited by examiner

*Primary Examiner* — Hung Lam
(74) *Attorney, Agent, or Firm* — Keating & Bennett, LLP

(57) ABSTRACT

A determining apparatus of the present invention includes: a feature extracting section configured to extract, as a feature from at least one captured image, at least one piece of information on the at least one captured image out of (i) a piece of information on a blur, (ii) a piece of information on a skew, and (iii) a piece of information on an image type; and a captured image determining section configured to determine whether or not the at least one captured image is suitable for conversion into a compressed image in a platform independent file format, by determining whether or not the extracted feature satisfies a given condition.

2 Claims, 17 Drawing Sheets

FIG. 6

| 0 | -1 | 0 |
|---|----|---|
| -1 | 4 | -1 |
| 0 | -1 | 0 |

FIG. 13

| MN | 0 |
|---|---|
| MN+$\Delta$ | 1 |
| MN+$\Delta$×2 | 2 |
| MN+$\Delta$×3 | 3 |
| MN+$\Delta$×4 | 4 |
| ⋮ | ⋮ |
| ⋮ | ⋮ |
| MN+$\Delta$×255 | 255 |

$\Delta = (MX-MN)/255$

MOBILE TERMINAL APPARATUS WHICH DISPLAYS CAPTURED IMAGES

This Nonprovisional application claims priority under 35 U.S.C. §119 on Patent Application No. 2013-246526 filed in Japan on Nov. 28, 2013, the entire contents of which are hereby incorporated by reference.

TECHNICAL FIELD

The present invention relates to a determining apparatus which determines whether or not an image is suitable for conversion into a compact PDF file, a mobile terminal apparatus, a program, and a recording medium.

BACKGROUND ART

Along with progress of Internet technologies, there are increasing opportunities to save an image captured with the use of an image-capturing apparatus-equipped mobile terminal apparatus such as a mobile phone or a smartphone having a camera function. In addition, there are increasing opportunities to capture not only images of landscapes, portraits, etc. but also images of explanatory diagrams and texts displayed in exhibitions etc. and images of slides used in academic conferences etc. A captured image is saved in a mobile terminal apparatus while the captured image is provided with a file name automatically given by the mobile terminal apparatus based on information such as an image-capturing date or a file name set by a user.

Such a captured image includes not only a captured image obtained by capturing an object from a front but also a captured image obtained by capturing the object from an oblique direction. The captured image obtained by capturing the object from the oblique direction has distortion. Therefore, for example, a technique is disclosed for carrying out a geometry distortion correction so as to generate an image which is prevented from having distortion. In order to generate an image which is prevented from having distortion, for example, Patent Literature 1 discloses a photographing apparatus which finds a contour of an image of an object, finds a shape of the image on the basis of the contour, finds a projection parameter showing a relationship between the shape of the image and an actual object, and carries out image conversion with the use of this projection parameter.

Meanwhile, there is a technique for converting an image into a compact PDF file (generating a compact PDF file, causing an image to be in a compact PDF format). An image compression technique based on layer separation such as Mixed Raster Content (MRC) has been practically used as a technique for use in converting an image into a compact PDF file. According to the image compression technique based on layer separation, a foreground mask indicative of a text and/or a line art image is generated from an image to be compressed, a color image is separated into a foreground layer and a background layer based on the generated foreground mask, and the foreground layer and the background layer are compressed with the use of compression techniques suitable for the foreground layer and the background layer, respectively. A compact image is finally generated through this processing.

Note here that a foreground layer, which is a layer including a text and/or a line art image, is generally compressed with the use of a lossless compression technique such as JBIG (Joint Bilevel Image Group), MMR (Modified Modified Read code), or LZW (Lempel Ziv Welch). Meanwhile, a background layer, which is a layer indicative of an image other than a text and/or a line art image, is generally compressed with the use of a lossy compression technique such as JPEG (Joint Photographic Experts Group).

A technique for converting an image into a compact PDF file is normally applied to an image obtained by reading a document placed on a contact glass, or an image obtained by reading a document conveyed from a document conveying apparatus. According to such a reading system, a distance between a reading apparatus and a document surface is fixed. This prevents an image obtained by reading a document from being blurred, and prevents the document from being read with the document excessively skewed.

CITATION LIST

Patent Literature

Patent Literature 1
Japanese Patent Application. Publication, Tokukai, No. 2005-122320 A (Publication Date: May 12, 2005)

SUMMARY OF INVENTION

Technical Problem

It is assumed that images captured in various scenes with the use of the image-capturing apparatus-equipped mobile terminal apparatus are converted into a compact PDF file and the compact PDF file is transmitted to an image display apparatus, an image forming apparatus, or the like. However, a captured image may be blurred in a case where a mobile terminal shake occurs or a camera of the mobile terminal apparatus is not focused on an object to be captured. In a case where the compression technique is applied to an image such that a captured image is blurred and a text and/or a line art image are/is blurred, a part(s) of the text and/or the line art image which part(s) is/are supposed to be extracted as a foreground layer is included in a background layer, and the background layer is subjected to resolution reducing processing. This makes the text and/or the line art image unclear and consequently causes a deterioration in image quality.

Further, as described earlier, an object may be captured while being greatly skewed to an image-capturing apparatus. In a case where a captured image thus has geometrical distortion, processing for correcting the geometrical distortion is carried out by interpolating a pixel. According to such interpolation processing, a part which has a large geometrical distortion is insufficient in amount of information. This causes a deterioration in interpolation accuracy, so that an image may be unclear. In a case where the compression technique is applied to a text and/or a line art image in an unclear image region, the text and/or the line art image are/is unclear as in the case where a captured image is blurred. This causes a deterioration in image quality.

As described earlier, a captured image may not be suitable for conversion into a compressed image in a platform independent file format such as a compact PDF file. In view of this, in a case where it is determined in advance whether or not a captured image is suitable for conversion into a compressed image in a platform independent file format, it is possible to notify a user of a result of the determination or give the user a notification for prompting the user to stop conversion processing, or to automatically stop the conversion processing. This consequently leads to prevention of a deterioration in image quality. Therefore, an object of the present invention is to provide a determining apparatus which is capable of determining whether or not a captured image is suitable for conversion into a compressed image in a platform independent file format.

Solution to Problem

In order to attain the object, a determining apparatus of an embodiment of the present invention includes: a feature extracting section configured to extract, as a feature from at least one captured image captured by an image-capturing apparatus, at least one piece of information on the at least one captured image out of (i) a piece of information on a blur, a piece of information on a skew, and (iii) a piece of information on an image type; and a captured image determining section configured to determine whether or not the at least one captured image is suitable for conversion into a compressed image in a platform independent file format, by determining whether or not the feature extracted by the feature extracting section satisfies a given condition.

Advantageous Effects of Invention

The configuration yields an effect of determining whether or not a captured image is suitable for conversion into a compressed image in a platform independent file format.

BRIEF DESCRIPTION OF DRAWINGS

FIG. 6 shows an example of an edge extraction filter.

FIG. 13 shows an example of a look-up table for use in a correction of a color balance.

DESCRIPTION OF EMBODIMENTS

An embodiment of the present invention is described below with reference to the drawings.

[Embodiment 1]

1. Mobile Terminal Apparatus

The following description will explain a mobile terminal apparatus 1 of Embodiment 1. Examples of the mobile terminal apparatus 1 encompass a smartphone, a tablet terminal, a digital still camera, and a mobile phone. According to Embodiment 1, in particular, the mobile terminal apparatus 1 carries out at least A/D conversion and a geometry distortion correction with respect to a captured image (captured image data) which is an image obtained by capturing an object, and determines whether or not the captured image is suitable for conversion into (generation of) a compressed image in a platform independent file format. The following description is given by using a compact PDF file as the compressed image in the platform independent file format. However, the compressed image in the platform independent file format is not limited to the compact PDF file. The number of captured images to be determined may be one or more.

The mobile terminal apparatus 1 converts the captured image into a compact PDF file or a normal PDF file in accordance with a result of the determination, and transmits such a PDF file via a network to an image forming apparatus (MFP) or an image display apparatus (e.g., an information display, an electronic whiteboard, or the like) so that the PDF file is subjected to output processing. A communication form of the network is not limited to a specific one, and the network can therefore be wireless or wired. The mobile terminal apparatus 1 is configured to transmit the PDF file while selecting a mode in which the output processing is carried out. The output processing will be later described. Further, the mobile terminal apparatus 1 is configured to capture an object while selecting a single shot or a multi-shot (described later).

Figure 1:
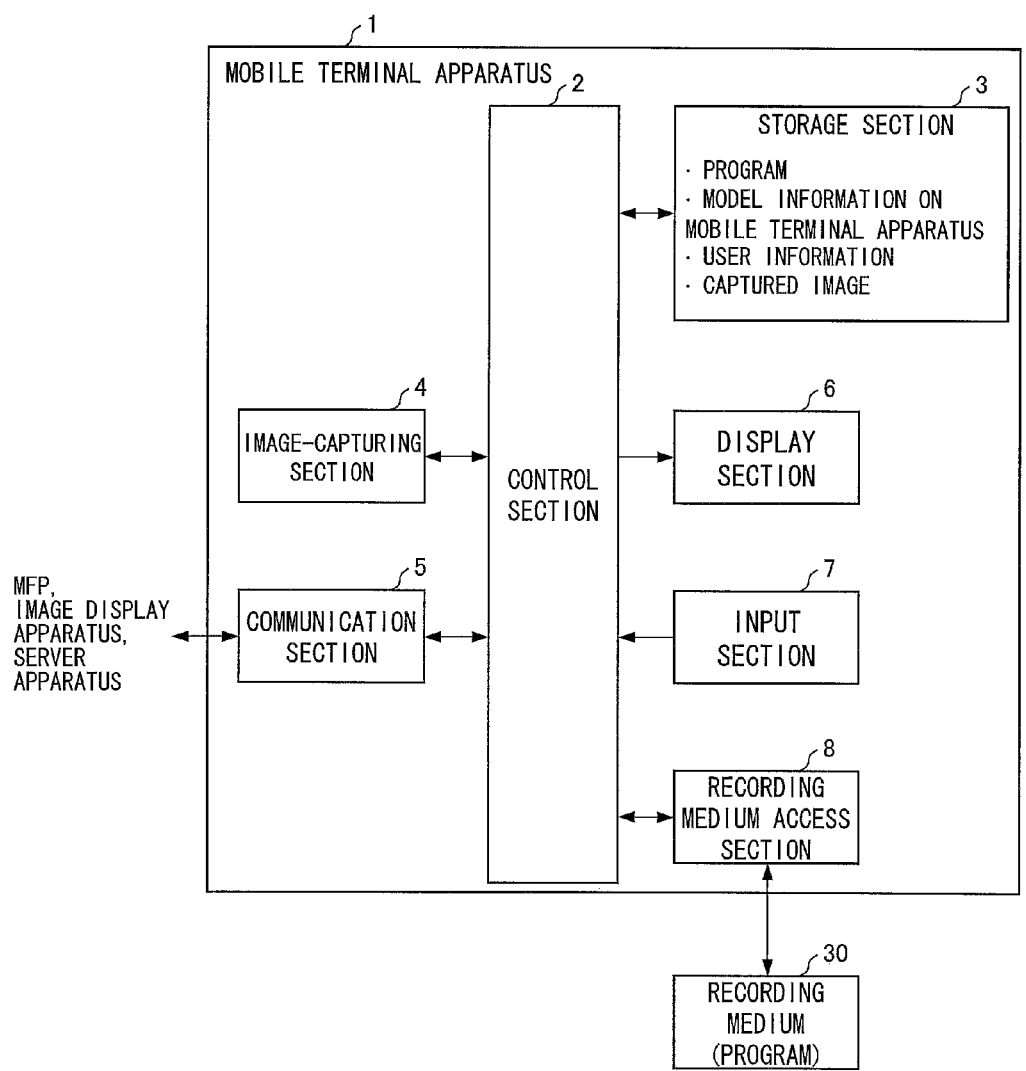
FIG. 1 is a block diagram illustrating a configuration of a mobile terminal apparatus of an embodiment of the present invention.

FIG. 1 is a block diagram illustrating a configuration of the mobile terminal apparatus 1. The mobile terminal apparatus 1 includes a control section 2, a storage section 3, an image-capturing section (image-capturing apparatus) 4, a communication section 5, a display section 6, an input section 7, and a recording medium access section 8 (see FIG. 1).

Figure 2:
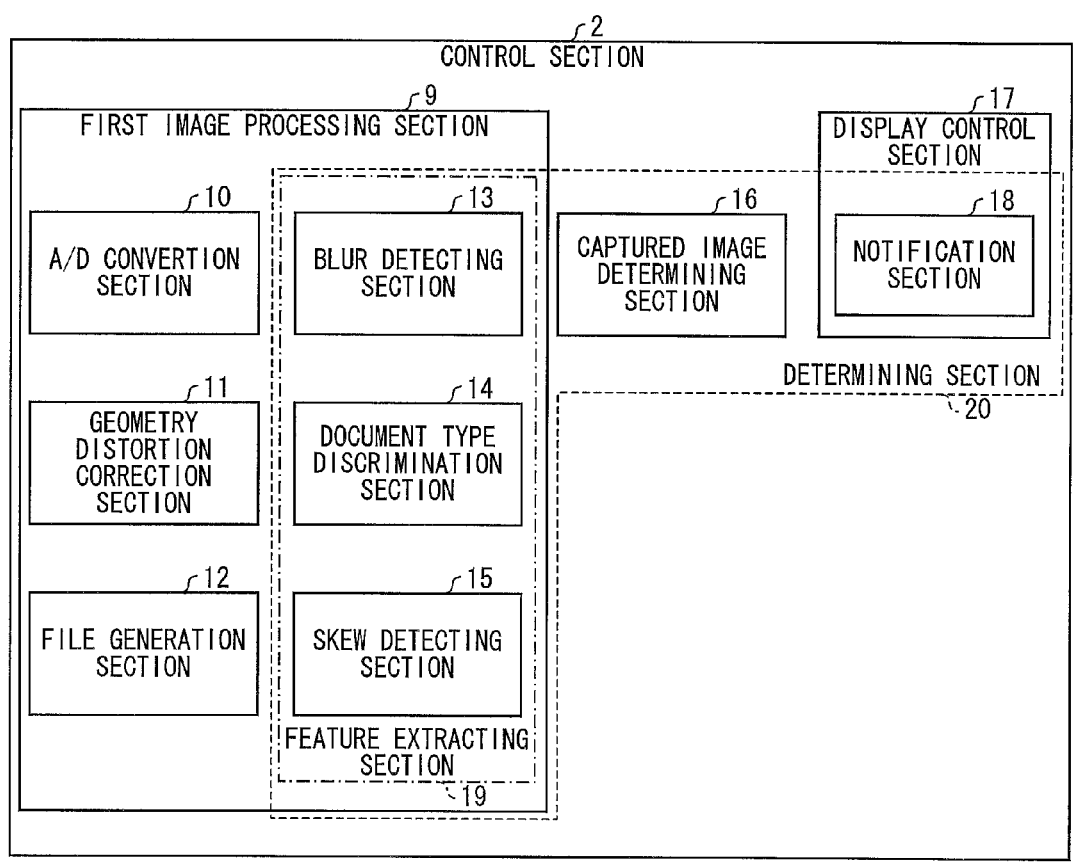
FIG. 2 is a block diagram illustrating a configuration of a control section of the mobile terminal apparatus.

The control section 2 is a block which comprehensively controls each block of the mobile terminal apparatus 1. The control section 2 functions as a first image processing section 9, a captured image determining section 16, and a display control section 17 (see FIG. 2). These sections will be later described.

The storage section 3 stores therein a program and data for each processing carried out by the mobile terminal apparatus 1. The storage section 3 further stores therein a captured image captured by the image-capturing section (image-capturing apparatus) 4. Note that the captured image may be a captured image received from an external device (not illustrated). The storage section 3 further stores therein model information on the mobile terminal apparatus 1, user information, and data required for carrying out the processing. Note that the user information is information for identifying a user of the mobile terminal apparatus 1. Examples of the user information encompass a user ID and a password.

The image-capturing section 4 is a block which captures an object with the use of a CCD sensor or a CMOS sensor, and then generates a captured image. Note that the image-capturing section 4 captures an object at preset resolution.

The communication section 5 is a block which carries out external data communication. According to Embodiment 1, the communication section 5 has a serial transfer/parallel transfer function based on USB (Universal Serial Bus) 1.1 or USB 2.0 and a wireless data communication function. The communication section 5 transmits the image to the image forming apparatus 50, the image display apparatus (not illustrated), or a server apparatus (not illustrated) in accordance with user input.

The display section 6 is realized by, for example, a liquid crystal display and the like, and displays various types of images and various types of information. The input section 7 has a plurality of buttons by which a user enters an input etc. with respect to the mobile terminal apparatus 1. Examples of the buttons encompass a shutter button for operating the image-capturing section 4, an autofocus setting button, an exposure adjusting bar, an image reading button (a button for reading out image data from the storage section 3), and a condition setting button. A touch panel can be provided in which the display section 6 and the input section 7 are integrated with each other.

The recording medium access section 8 is a block which reads out a program from a recording medium 30 which stores a program for carrying out each processing of the mobile terminal apparatus 1.

1-1. First Image Processing Section

The first image processing section 9 is a block which carries out image processing with respect to a captured image. The first image processing section 9 includes an A/D conversion processing section 10, a geometry distortion correction section 11, a file generation section 12, and a feature extracting section 19 (see FIG. 2).

The A/D conversion processing section 10 is a block which carries out A/D conversion processing with respect to a captured image which has been captured by the image-capturing section 4.

The geometry distortion correction section 11 is a block which corrects distortion of a rectangular captured object, such as a poster or a document, which distortion is caused by capturing the captured object from a direction different from a normal to a plane on which a document image is formed (i.e. distortion of a rectangular plane on which the document image is formed) and which corrects skew of the captured object in the captured image.

Specifically, the geometry distortion correction section 11 finds, on the basis of captured image data, equations of straight lines corresponding to four groups of edge pixels that serve as a boundary between a rectangular captured object and a background. Then, the geometry distortion correction section 11 specifies a quadrangular region (pre-corrected region) surrounded by the four straight lines, and cuts out the specified pre-corrected region.

Figure 12:
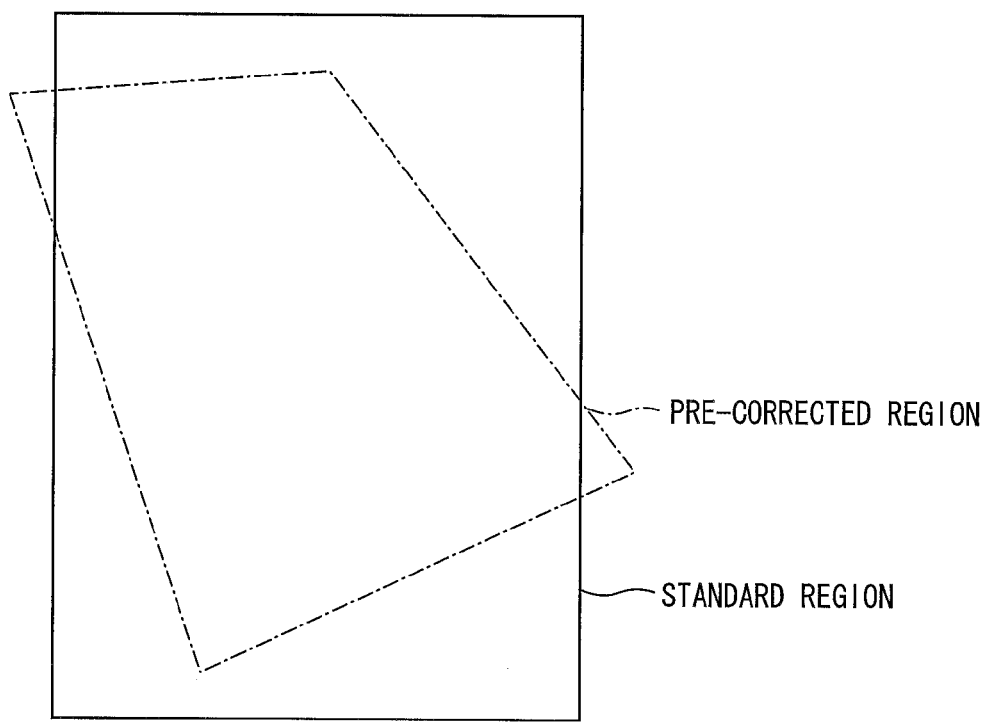
FIG. 12 shows an example of a correction carried out in a geometry distortion correction of an image.

Next, the geometry distortion correction section 11 obtains a mapping for converting the specified rectangular pre-corrected region (indicated by the dashed-dotted line in FIG. 12) into a rectangular standard region (e.g. 7:10 in the case of A series paper size and B series paper size used for office documents; indicated by the solid line in FIG. 12) whose upper and lower sides are substantially parallel with a horizontal direction and which has a predetermined aspect ratio and a predetermined size as shown in FIG. 12. Note that the upper and lower sides of the standard region need not necessarily be completely parallel with the horizontal direction and may be tilted by a small angle within a predetermined range with respect to the horizontal direction (may be substantially parallel with the horizontal direction).

Note that mapping means rules fx and fy for mapping conversion (coordinate conversion) from coordinates (x1, y1) of each pixel of the pre-corrected region to coordinates (x2, y2) of a corresponding pixel of the standard region, and is expressed by the following equations: x2=fx(x1, y1) and y2=fy(x1, y1). A known technique can be used as the mapping conversion. Note that the geometry distortion correction section 11 may carry out the conversion in conformity with an aspect ratio stored in advance in the storage section 3 or may carry out the conversion in conformity with an aspect ratio inputted from the input section 7. A size of the standard region may be one inputted from the input section 7 or may be one whose area is same as the pre-corrected region.

Next, the geometry distortion correction section 11 carries out the coordinate conversion with respect to the pre-corrected region that has been cut out from the captured image data in accordance with the mapping. This makes it possible to correct geometrical distortion and skew (this correction is hereinafter sometimes referred to as geometry distortion correction)

A method for the geometry distortion correction is not limited to the aforementioned method, and can be a perspective transformation method or a known method.

The feature extracting section 19 is a block which extracts, as a feature from a captured image, at least one piece of information on the captured image out of (i) a piece of information on a blur, (ii) a piece of information on a skew, and (iii) piece of information on an image type. The feature extracting section 19 includes a blur detecting section 13, a document type discrimination section 14, and a skew detecting section 15. These members will be later described.

The file generation section 12 is a block which generates a PDF file from a captured image (converts the captured image into the PDF file). A compact PDF file is generated by carrying out the following (1) through (5):

(1) Foreground mask generation processing is carried out in which a foreground mask indicative of a text pixel is extracted from an input image. In the foreground mask generation processing, a pixel which is determined as a text region in the segmentation processing is binalized so as to extract the text pixel.

(2) Foreground color index processing is carried out in which a foreground pixel color is depicted by index and a foreground index color table is generated. The foreground index color table includes a (i) foreground layer indicating an index image, (ii) each text color of the foreground layer, (iii) maximum coordinates and minimum coordinates of respective text color regions, and (iv) the number of pixels belonging to each index. The foreground color index processing can be carried out by a method disclosed in Japanese Patent Application Publication, Tokukai, No. 2002-94805 A. This method relates to index processing of a foreground color. According to the method, all foreground pixels are indicated by the limited number of colors when a foreground layer is generated. Specifically, the foreground image is finally depicted by index by updating the foreground index color table of the foreground pixel. In a case where it is determined that the foreground pixel color of each foreground pixel has already been registered on the foreground index color table, an index value having a closest color in the foreground index color table is assigned to the each foreground pixel. In a case where it is determined that no foreground pixel color of each foreground pixel has been registered on the foreground index color table, a new index value is assigned to the each foreground pixel and is registered on the foreground index color table. The foreground image is depicted by index by repeating the aforementioned processing.

(3) Background layer generation processing is carried out in which the foreground pixel is removed from the input image and a background layer is generated. In order to improve compression efficiency of the background layer, a hole filling process is carried out with the use of peripheral background layer pixels which are located peripheral to the foreground pixel and are not foreground pixels. With reference to the background pixels which are located peripheral to the foreground pixel and are not foreground pixels, the background layer foreground pixel part is filled with the use of an average value of the background pixels. In a case where a background pixel which is not a foreground pixel is not present in a vicinity of the foreground pixel, a result of a neighbor hole filling process is used. Alternatively, it is possible to carry out resolution reducing processing with respect to the background image by carrying out, with respect to the image which has been subjected to the hole filling process, interpolation processing such as a downsampling process, nearest neighbor, bi-linear, or bi-cubic. For example, a resolution of the input image can be reduced by half.

(4) Binary image generation processing is carried out in which a binarized image of each index is outputted with the use of (i) the inputted foreground layer and (ii) coordinates information which has been generated in the foreground color indexing processing.

(5) Suitable compression processing is carried out with respect to each layer. As described above, the foreground layer is compressed by the MMR (Modified Modified Read, lossless compression technology). On the other hand, the background layer is compressed by the JPEG (Joint Photographic Experts Group, lossy compression technology).

Note that in order to generate a normal PDF file from a captured image, all sets of image data for respective pages are compressed as a single JPEG image and are then embedded in a file with a PDF format. In this case, it is possible to carry out text recognition processing with respect to a text so as to embed a transparent text in the image data in accordance with a drawing command.

1-1-1. Blur Detecting Section

Figure 3:
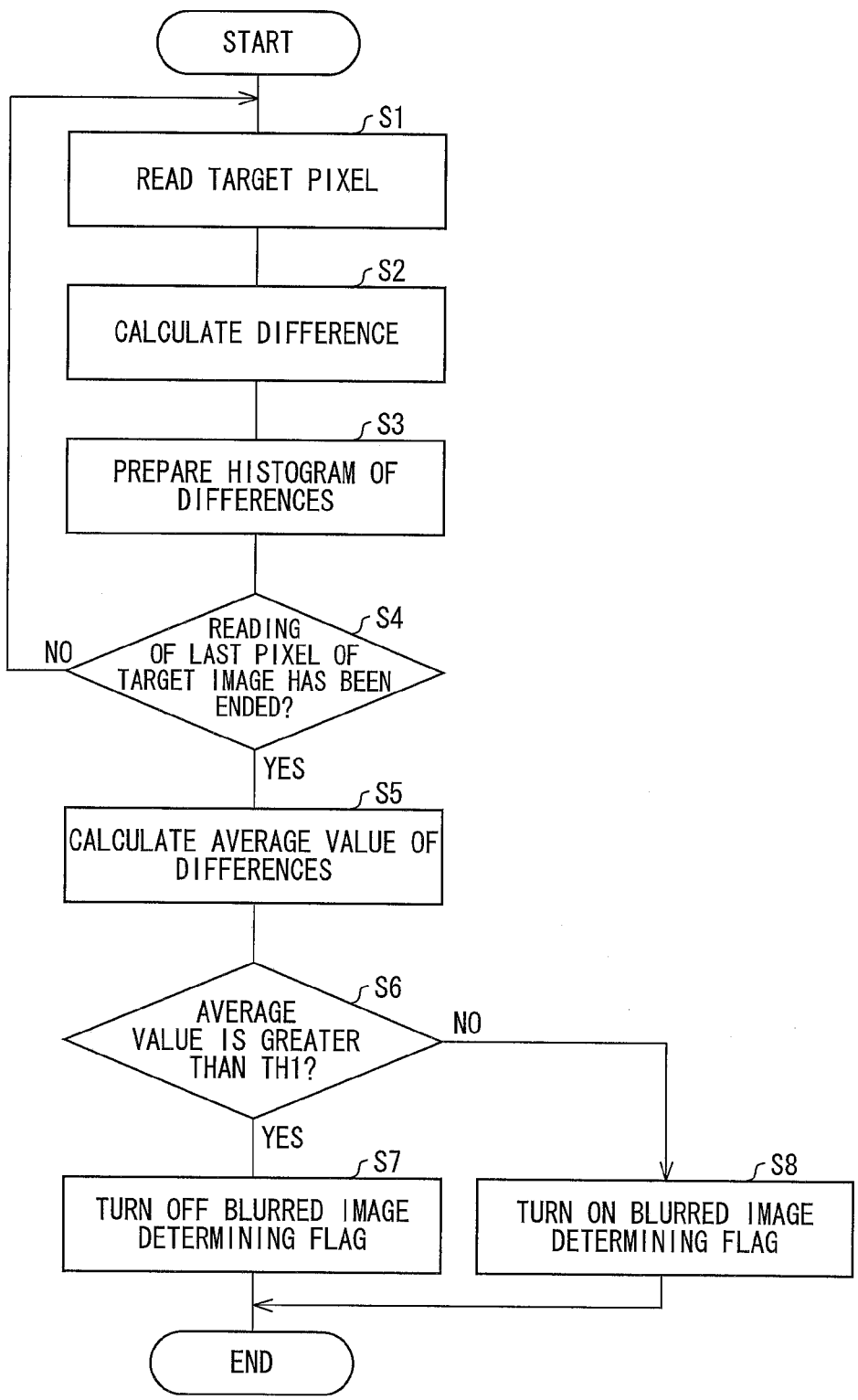
FIG. 3 is a flow chart showing processing carried out by a blur detecting section of the mobile terminal apparatus.

The blur detecting section 13 is a block which detects information on a blur of a captured image. According to Embodiment 1, the blur detecting section 13 detects, as information on a blur, information as to whether or not a blur occurs in an image. Processing carried out by the blur detecting section 13 is described below with reference to FIG. 3.

First, the blur detecting section 13 reads a pixel (target pixel) of a target image (captured image) (S1), converts RGB image data into luminance data, and finds an absolute value of a difference between adjacent pixels (S2). Note here that the RGB image data is converted into the luminance data based on the following equation:

$$Y=0.3R+0.6G+0.1B$$

where Y is a luminance, and R, G, and B are values of color components of captured image data.

Note that it is also possible to use brightness data or G data instead of the luminance data. The absolute value of the difference is found for each pixel.

Figure 4:
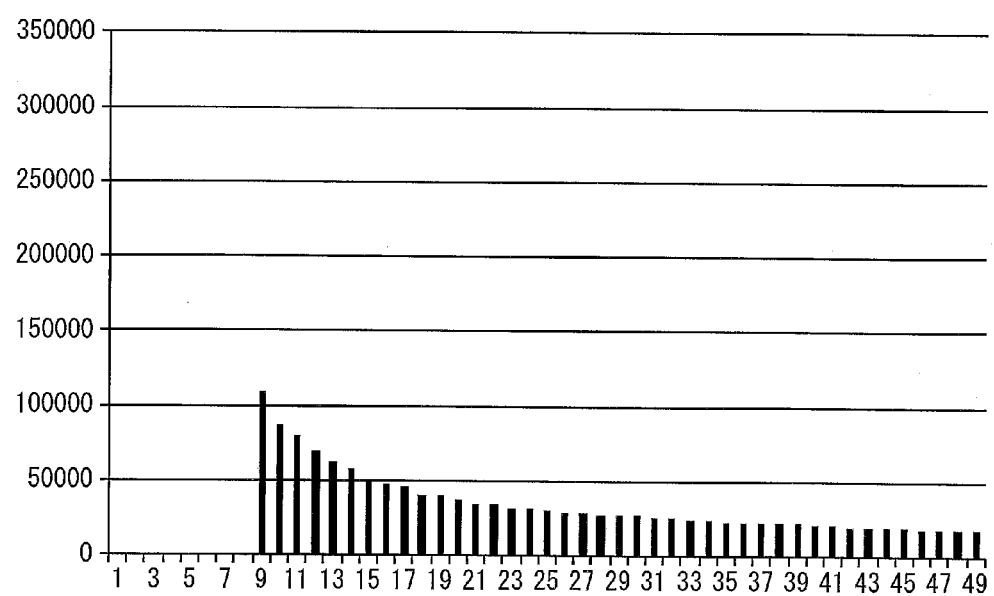
FIG. 4 shows an example of a histogram of differences for a less blurred captured image.
Figure 5:
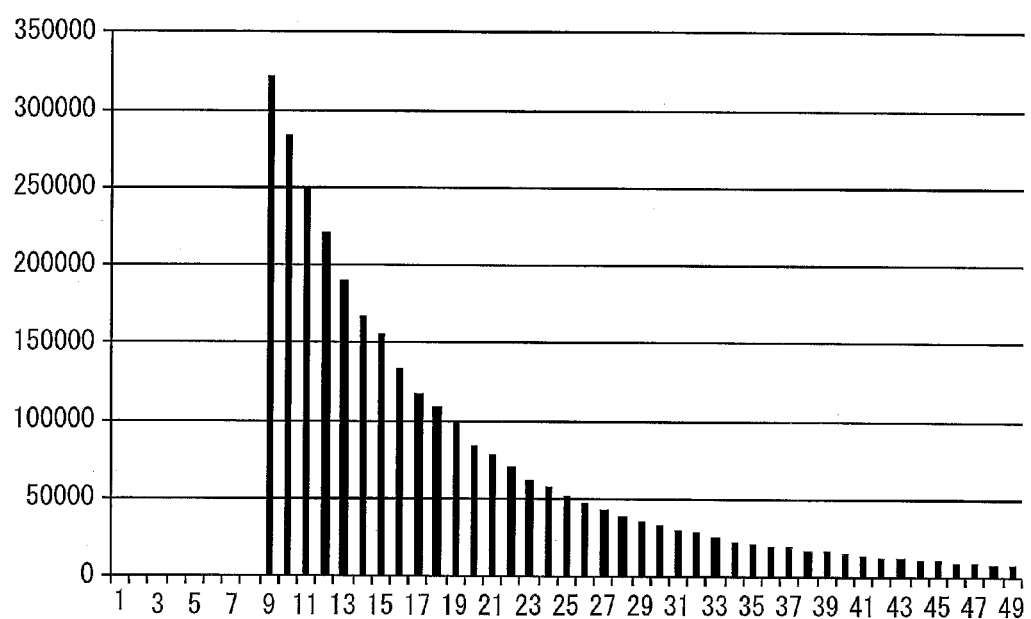
FIG. 5 shows an example of a histogram of differences for a greatly blurred captured image.

Next, the blur detecting section 13 prepares a histogram of calculated absolute values of differences between respective adjacent pixels (S3). FIG. 4 and FIG. 5 each show an example of the prepared histogram. FIG. 4 shows an example of a histogram of differences for a less blurred captured image. FIG. 5 shows an example of a histogram of differences for a greatly blurred captured image. Note that in calculation of the differences, a difference which is 0 or is extremely small may include many differences derived from, for example, a noise component caused by a sensor output. Note here that in order to determine occurrence of a blur, it is only necessary to determine whether or not there is a great difference. Therefore, by carrying out calculation without including, in the subsequent count, differences each falling below a predetermined difference, an influence of these differences is removed.

Then, the blur detecting section 13 determines whether or not reading of the last pixel of the target image has been ended (S4). The blur detecting section 13 which determines in S4 that reading of the last pixel of the target image has not been ended (No in S4) repeats the processing from S1. The blur detecting section 13 which determines in S4 that reading of the last pixel of the target image has been ended (Yes in S4) calculates an average value of the absolute values of the differences between the respective adjacent pixels (S5) and determines whether or not the average value of the absolute values of the differences between the respective adjacent pixels is greater than a threshold value TH1 (e.g., 24 in the case of a 256-tone (8-bit) image) (S6). In a case where the average value of the absolute values is greater than the threshold value (YES in S6), the blur detecting section 13 determines that the image is less blurred, and the blur detecting section 13 turns off a blurred image determining flag (S7) so as to end the processing. In a case where the average value of the absolute values is not greater than the threshold value (NO in S6), the blur detecting section 13 determines that the image is greatly blurred, and the blur detecting section 13 turns on the blurred image determining flag (S8) so as to end the processing.

In a case where a blur occurs in an image, an edge of the image is blurred. This causes a reduction in absolute value of a difference between respective adjacent pixels, and ultimately causes a reduction in the average value of the absolute values of the differences between the respective adjacent pixels. Accordingly, the blur of the image can be determined by carrying out threshold value processing with respect to the average value of the absolute values of the differences between the respective adjacent pixels. A blur of an image occurs in a case where (i) the image is captured by the mobile terminal apparatus 1 and (ii) a mobile terminal shake occurs or (iii) a camera of the mobile terminal apparatus is not focused on an object to be captured.

During generation of a compact PDF file, a region in which contrast is high is extracted as a foreground layer, and a blur occurs in a region in which contrast is originally high, so that contrast of an edge is lowered. It is highly likely that a region in which contrast of an edge is thus lowered is not extracted as a foreground layer and is included in a background layer. In the background layer, a file capacity is reduced by carrying out resolution reducing processing or setting compression efficiency to be high, so that a small text and the like are illegible, and readability of a text may be lost. This is a phenomenon uniquely occurring during generation of a compact PDF file. Such a phenomenon does not occur in a normal PDF file which is in conformity with a normal compressed/uncompressed image format such as JPEG or TIFF. Therefore, the phenomenon does not matter in a case where saving is carried out by use of a normal PDF file.

Figure 6:
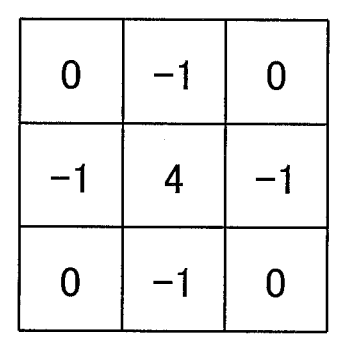

It is also possible to determine occurrence of a blur as below instead of carrying out the threshold value processing by finding the average value of the absolute values of the differences between the respective adjacent pixels as described earlier. An edge strength is calculated with respect to a text document by use of an edge extraction filter as illustrated in FIG. 6, a standard deviation of the edge strength is found, and threshold value (e.g., 8 in the case of 256-tone image data) processing is carried out. In a case where the edge strength is not more than the threshold value, it is determined that a blur occurs.

1-1-2. Document Type Discrimination Section

The document type discrimination section 14 is a block which discriminates a document type of a captured image. The document type discrimination section 14 discriminates the captured image between a text-based document and a photograph-based document. The discrimination can be carried out by, for example, a simple method as described below.

Captured image data is divided into, for example, blocks constituted by 128×128 pixels of the entire image. Then, an absolute value (range) of a difference between a maximum value and a minimum value of pixel values in a block, and an average value of absolute values of differences between respective adjacent pixels are found for each of the blocks. The average value of the absolute values of the differences between the respective adjacent pixels are found by, for example, finding an absolute value of a difference between a pixel value of a right pixel and a pixel value of a left pixel, and carrying out this finding processing with respect to pixels in the block (excluding pixels located at an outer edge of the block). Then, it is determined whether or not a range of the pixel values, the average value of the absolute values of the differences, and a standard deviation fall within respective predetermined ranges.

In a case where the range of the pixel values, the average value of the absolute values of the differences between the respective adjacent pixels, and the standard deviation fall within the respective predetermined ranges (e.g., in the case of a 256-tone image, the range of the pixel values is not more than 64, the average value of the absolute values of the differences between the respective adjacent pixels is not more than 10, and the standard deviation is not more than 10), it is determined that the block is a photograph region block. In a case where the range of the pixel values, the average value of the absolute values of the differences between the respective adjacent pixels, and the standard deviation do not fall within the respective predetermined ranges, it is determined that the block is a text region block. Since a photograph has a tone property, the absolute value of the difference between the maximum value and the minimum value of the pixel values in the block, the average value of the absolute values of the differences between the respective adjacent pixels, or the standard deviation is small. Accordingly, it is possible to segment a region into a photograph region and a text region by, for example, setting the threshold values for these features as described earlier.

In a case where the total number of photograph blocks is in not less than a predetermined ratio (e.g., 70%) to the number of blocks of the entire image after the determination for each of the blocks is carried out with respect to the captured image data, it is determined that the captured image data is a captured image of a photograph-based document.

1-1-3. Skew Detecting Section

The skew detecting section 15 is a block which detects a skew of a document in a captured image. In a case where an image of a document is captured while the document is skewed to a camera, when a geometry distortion correction is carried out with respect to the captured image, a blur occurs in an image located at the back of (at a distance from) the captured image. For example, the following description discusses a case where perspective transformation is used as a geometry distortion correction method. The perspective transformation is a method in which for example, an input image prepared by capturing an image of a tall building from the ground is subjected to geometrical conversion as if the input image was prepared by capturing the image of the tall building from the front. According to the perspective transformation, a target pixel p (x, y) is transformed into P (X, Y) expressed by the following equations:

$$X=(ax+by+c)/(px+qy+r)$$

$$Y=(dx+eY+f)/(px+qy+r)$$

where a, b, c, d, e, f, p, q, and r are parameters determined depending on a center of perspective transformation in an image and a ratio of vertical or horizontal enlargement of the image (see Japanese Patent Application Publication, Tokukai, No. 2005-202593 A).

In order to correct a captured image in which geometrical distortion occurs, it is necessary to estimate a pixel that is absent in the captured image which has not been transformed, and by using captured image data which has not been transformed, it is necessary to find, by interpolation calculation, the captured image data which has been transformed. The interpolation calculation is carried out by use of a generally-known bilinear or bicubic interpolation method. In carrying out the interpolation calculation, interpolation can be carried out with comparatively high accuracy with respect to a pixel located at the front of the captured image since the pixel is less distorted. Meanwhile, interpolation may be carried out with slightly lower accuracy with respect to a pixel located at a distance from the captured image since the pixel is greatly distorted. This may cause an image to be unclear. In a case where a text and/or a line art image are/is present at a distance from the captured image, the text and/or the line art image is made unclear. This may prevent the text and/or the line art image from being extracted as a foreground layer (described earlier). This causes a deterioration in image quality.

Therefore, the skew detecting section 15 extracts a rectangular region of the captured image so as to find a degree (angle) of distortion of the rectangular region. In order to find the degree of distortion of the rectangular region, first, the skew detecting section 15 uses the following (1) through (4) methods, for example to find coordinates of four vertexes (coordinates at four corners) of a document and to obtain equations for straight lines of four sides of the document.

(1) First, edge extraction is carried out. The edge extraction is carried out by, for example, applying a Canny filter (a filter for detecting a thinned edge with the use of a Gaussian filter and a Sobel filter) to luminance data. In this case, for example, smoothing may be performed before filtering processing, or morphology conversion such as expansion and contraction may be performed after the filtering processing.

(2) Next, labeling and feature region extraction are carried out. Labeling of pixels which are adjacent to each other in four directions or eight directions is carried out with respect to an extracted edge image, and feature region extraction is carried out in accordance with a result of the labeling. For example, a labeled region is extracted whose width is ¼ or larger than an image width, whose height is ¼ or larger than an image height, whose center has an x coordinate which is ¼ or larger and ¾ or smaller than the image height, and whose center has a y coordinate which is ¼ or larger and ¾ or smaller than the image height. It is assumed here that an upper left corner of a captured image area is an origin, a rightward direction is an x coordinate, and a downward direction is a y coordinate.

(3) Subsequently, straight lines defining a quadrangle are extracted, that a geometrical arrangement is detected. For example, an upper side of the quadrangle is extracted by searching for an edge pixel in the downward direction along a y axis from coordinates (0, 0) of an edge image to coordinates which are ½ of an image height. Then, coordinates at which an edge pixel is found for the first time are recorded (set as (0, y0)). Next, an edge pixel is searched for in the downward direction along the y axis from coordinates (1, 0). Then, coordinates at which an edge pixel is found for the first time are recorded (set as (1, y1)). In this case, when $y0-1 \leq y1 \leq y0+1$, it is determined that these two points are connected, and the count is increased by 1. When $y0-1 \leq y1 \leq y0+1$ is not satisfied, the count is reset to 0. In a case where no edge pixel is detected, the count is reset to 0. This processing is repeated to an end of an image, and a group of coordinates that is the largest in number of counts is recorded as coordinates defining a straight line.

The equations for the straight lines are obtained from the recorded group of coordinates by use of, for example, a least-square method. In this case, for example, when coordinates of the group of coordinates that is the largest in number of counts fall below ¼ of the image width, processing is carried out for not extracting that group of coordinates as a straight line. According to this, in a case where no straight line could be extracted, information that no straight line could be extracted is recorded.

(4) Finally, intersections of the straight lines are found. In a case where the above method (3) makes it possible to extract the four sides and obtain the equations for the straight lines, it is possible to easily find an intersection of two straight lines. Therefore, coordinates of an intersection of the left side straight line and the upper left side straight line are recorded as coordinates of an upper left vertex, coordinates of an intersection of the upper side straight line and the right side straight line are recorded as coordinates of an upper right vertex, coordinates of an intersection of the right side straight line and the lower side straight line are recorded as coordinates of a lower right vertex, and coordinates of an intersection of the lower side straight line and the left side straight line are recorded as coordinates of a lower left vertex. Also in a case where not all the four sides could be extracted by the above method (3) but three sides, for example could be extracted, the remaining one side is assumed to be a straight line located at the end of the image, and an equation for the straight line is obtained (in a case where the left side cannot be extracted, an equation x=0 for the straight line is obtained). Coordinates of four vertexes are found by use of the equation for the straight line, and information that only three sides could be extracted is further recorded.

The above methods make it possible to use the coordinates of the four vertexes and the straight lines of the four sides. Note that the coordinates of the four vertexes and the straight lines of the four sides may also be found by use of a publicly-known method other than the above methods. Since the straight lines of the four sides and the coordinates of the four vertexes have been found by the above methods, angles formed by the sides defining the rectangular region are found by use of the straight lines of the four sides and the coordinates of the four vertexes.

1-2. Captured Image Determining Section

The captured image determining section 16 is a block which determines whether or not a captured image is suitable for generation of a compact PDF file. In a case where any of features extracted (detected) by the feature extracting section 19 does not satisfy a given condition, the captured image determining section 16 determines that the captured image is not suitable for generation of the compact PDF file. That is, in a case where any one of the extracted features does not satisfy the given condition, the captured image determining section 16 determines that the captured image is not suitable for generation of the compact PDF file.

1-2-1. Blur

The captured image determining section 16 determines, in accordance with a result of the processing carried out by the blur detecting section 13, that the captured image for which it has been determined that the blurred image determination flag is on or a blur occurs in the captured image (the captured image is blurred) is not suitable for generation of the compact PDF file. In contrast, the captured image determining section 16 determines that the captured image for which it has been determined that the blurred image determination flag is off or the captured image is not blurred is suitable for generation of the compact PDF file.

The reason why it is determined that a blurred image is not suitable for generation of a compact PDF file is because of the following reason. In a case where an image is blurred in processing carried out for generating a compact PDF file, a text part is extracted as a foreground mask with lower accuracy. According to this, it is easily determined that the text part is a background layer. Since the background layer is subjected to compression processing with high compression efficiency, the text part for which it has been determined that the text part is the background layer further deteriorates in image quality as compared with a non-blurred image. Therefore, it is determined that the blurred image is not suitable for generation of the compact PDF file.

1-2-2. Document Type

A photograph region is segmented into background regions. The background regions are subjected to resolution reducing processing and are also subjected to compression processing carried out by setting compression efficiency to be high. In this case, the photograph region may conspicuously deteriorate in image quality. In particular, a document which has only a photograph region is not suitable to be subjected to the resolution reducing processing and the compression processing. In the case of a document in which a text region and a photograph region coexist, the photograph region may slightly deteriorate in image quality, whereas reproducibility of the text region is secured. Therefore, the captured image determining section 16 determines that there is no problem with generation of a compact PDF file in the case of a text-based document.

In view of the above description, the captured image determining section 16 determines, in accordance with the discrimination by the document type discrimination section 14, that the captured image which is text-based is suitable for generation of the compact PDF file. In contrast, the captured image determining section 16 determines that the captured image which is photograph-based is not suitable for generation of the compact PDF file.

1-2-3. Skew

The greatest angle of angles formed by the sides defining the rectangular region and found by the skew detecting section 15 is extracted so as to be compared with a threshold value.

The captured image determining section 16 determines whether or not the extracted angle θ falls within a given range (e.g., from −30° to +30°). In a case where the angle θ falls within the given range (e.g., is smaller than 30°), the captured image determining section 16 determines that the captured image is suitable for generation of the compact PDF file.

1-3. Display Control Section

The display control section 17 is a block which controls a display on the display section 6. The display control section 17 has a function of a notification section 18. The notification section 18 is a block which notifies a result of the determination by the captured image determining section 16, particularly a block which gives notification in a case where the captured image is not suitable for generation of the compact PDF file. According to Embodiment 1, notification is given by the display on the display section 6. Therefore, the notification section 18 functions as one function of the display control section 17.

According to Embodiment 1, the notification section 18 notifies suitability for generation of the compact PDF file or information on the suitability separately when a single shot is carried out (one image is captured) and when a multi-shot is carried out (a plurality of images are captured). Note that the single shot or the multi-shot can be selected by the user via the input section 7 before image capture is carried out.

1-3-1. Single Shot

Figure 7:
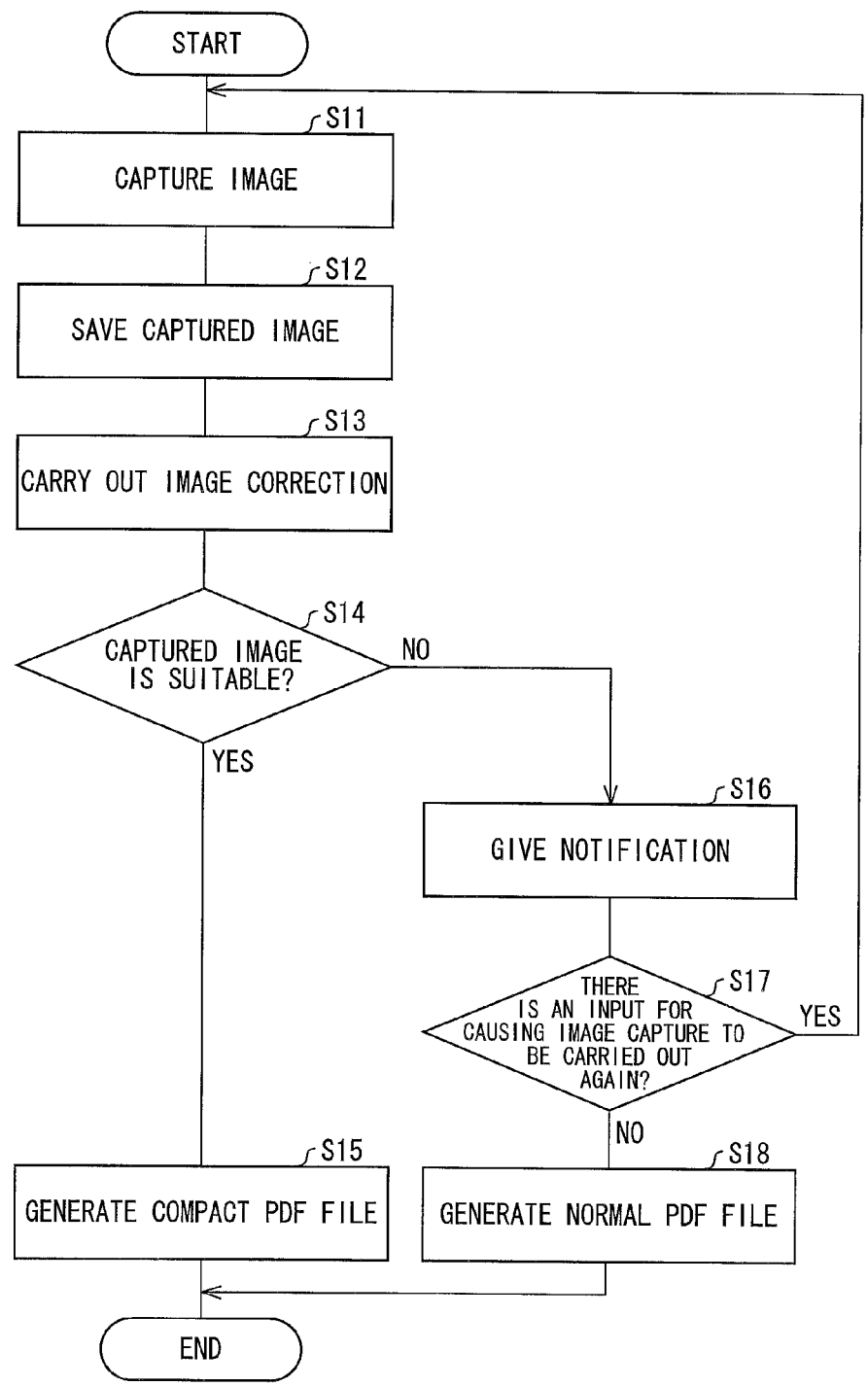
FIG. 7 is a flow chart showing a flow of processing carried out by the mobile terminal apparatus while an image is being captured by a single shot.

The following description will explain, with reference to the flow chart of FIG. 7, notification by the notification section 18 in a case where image capture is carried out by the single shot. As shown in FIG. 7, in a case where image capture is carried out (in a case where, after one image is captured, the user selects an OK button in response to an inquiry as to whether or not image capture has been completed) (S11), the captured image is saved in the storage section 3 (S12) and is subjected to an image correction including a geometry distortion correction (S13). Next, it is determined whether or not the captured image is suitable for generation of the compact PDF file (S14). In a case where a result of the determination is that the captured image is not suitable for generation of the compact PDF file (NO in S14), notification is given on the display section 6 (S16). In the notification in S16, a message which prompts image capture to be carried out again is displayed as described later. Therefore, it is subsequently determined whether or not there is an input for causing image capture to be carried out again (S17). In a case where there is an input for causing image capture to be carried out again (YES in S17), processing is repeated from image capture in S11. In a case where there is no input for causing image capture to be carried out again (NO in S17), a normal PDF file is generated (S18) and the processing is ended (described later).

In a case where the result of the determination in S14 is that the captured image is suitable for generation of the compact PDF file (YES in S14), the compact PDF file is generated from the captured image (S15) and the processing is ended.

Figure 8:
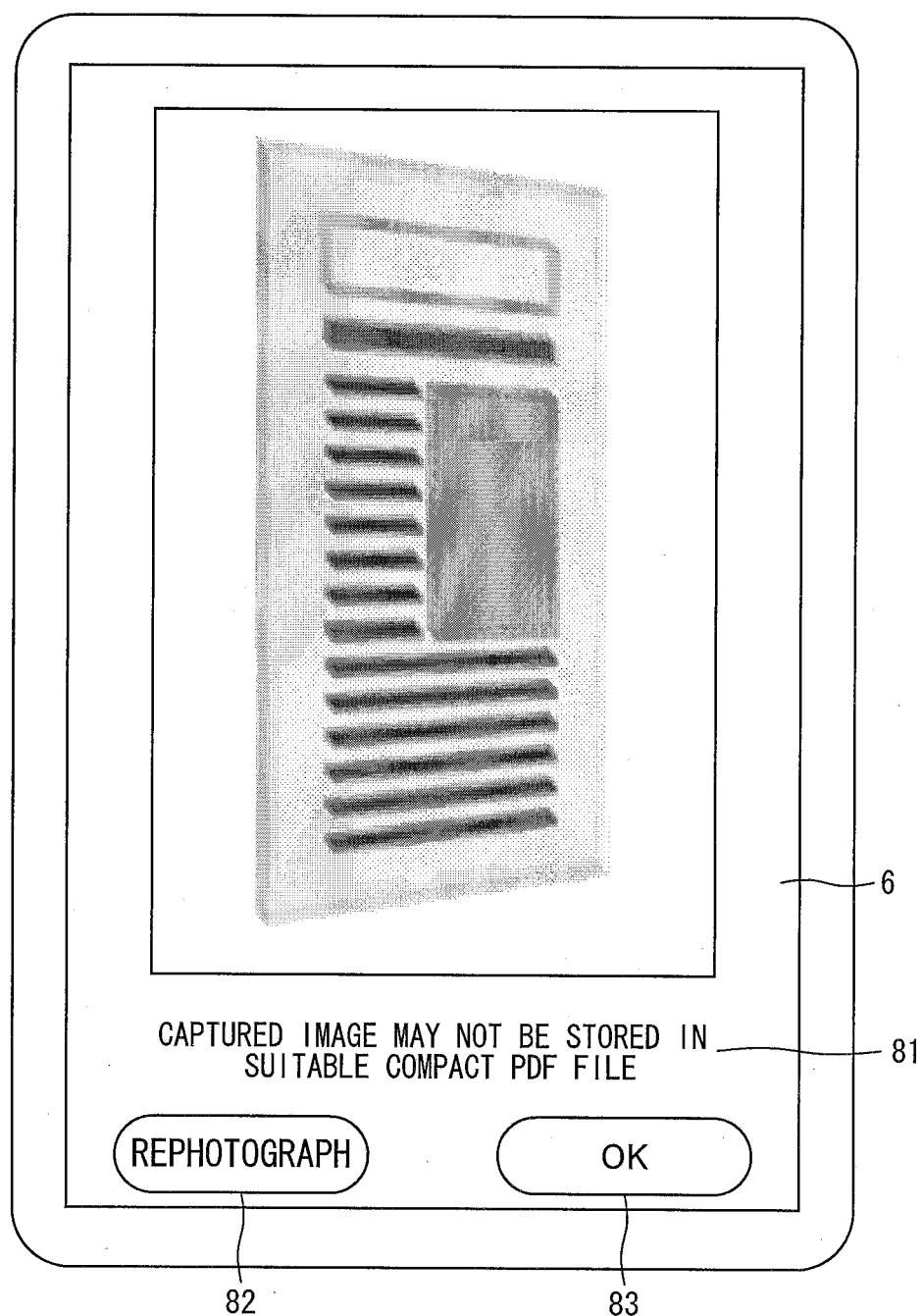
FIG. 8 shows a display example in which captured image is preview-displayed.

In the notification in S16, the captured image is preview-displayed on the display section 6. FIG. 8 shows a display example of the preview-display. In a case where a blur occurs in the captured image which has been corrected (the captured image which has been corrected is a blurred image), the captured image is extremely low in contrast, so that generation of the quality. Therefore, the notification section 18 carries out a display of a message 81 that "the captured image may not be saved in a suitable compact PDF file" (see FIG. 8). According to Embodiment 1, the message 81 is displayed. Alternatively, it is possible to display merely a determination of whether or not it is suitable to generate the compact PDF file.

In the display example shown in FIG. 8, a rephotograph button 82 is a button for receiving an input for causing image capture to be carried out again. When the rephotograph button 82 is pressed, the control section 2 considers that the user who checked the message 81 and desires to generate the compact PDF file has determined to recapture an image. Then, the control section 2 starts controlling image recapture.

In the display example shown in FIG. 8, an OK button 83 is an input button for prompting the captured image to be in a PDF format (prompting the captured image to be converted into a PDF file, prompting the PDF file to be generated from the captured image). When the OK button 83 is pressed, the control section 2 considers that the user who checked the preview-display and the message 81 has determined that there is no problem with generation of the PDF file. Then, the control section 2 starts controlling processing for generating the PDF file. In a case where the OK button 83 is pressed, the captured image is saved not in the compact PDF file but in the normal PDF file. This is because, since the mobile terminal apparatus 1 has determined, as a result of the determination of whether or not it is possible to generate the compact PDF file, that the captured image is not suitable for generation of the compact. PDF file, control is carried out so that the captured image is set to be saved not in a compact PDF format but in a normal PDF format. Such control prevents a reduction in image size by high compression. However, an influence on readability can be minimized by causing the captured image to be in the normal PDF format so that readability is not impaired.

1-3-2. Multi-Shot

Figure 9:
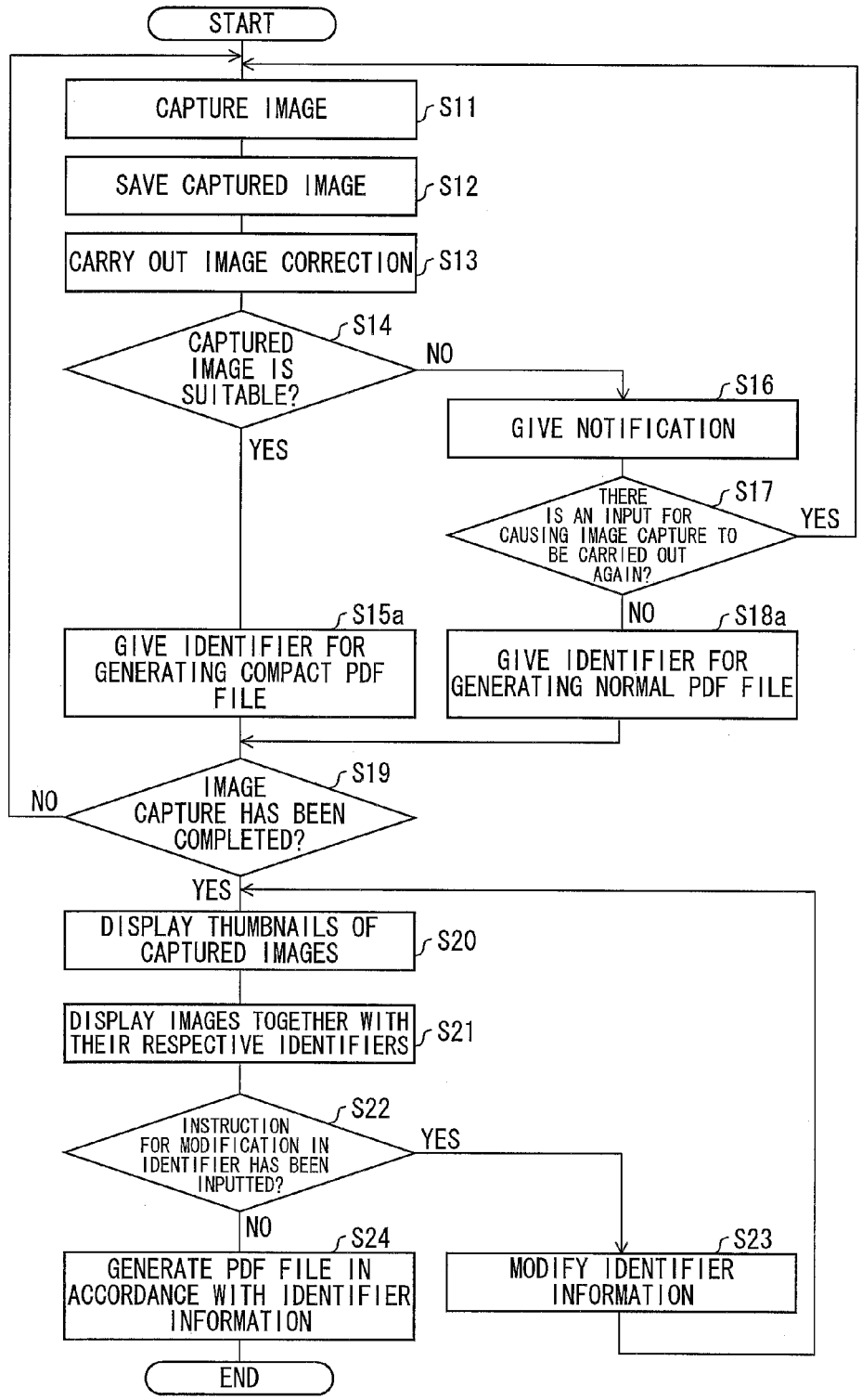
FIG. 9 is a flow chart showing a flow of processing carried out by the mobile terminal apparatus while images are being captured by a multi-shot.

The following description will explain, with reference to the flow chart of FIG. 9, notification by the notification section 18 in a case where image capture is carried out by the multi-shot. As shown in FIG. 9, in a case where one image is captured, (S11), the captured image is saved in the storage section 3 (S12) and is subjected to an image correction including a geometry distortion correction (S13). Next, it is determined whether or not the captured image is suitable for generation of the compact PDF file (S14). In a case where a result of the determination is that the captured image is not suitable for generation of the compact PDF file (NO in S14), notification is given on the display section 6 (S16). In the notification in S16, a message which prompts image capture to be carried out again is displayed as in the case of the single shot. Therefore, it is subsequently determined whether or not there is an input for causing image capture to be carried out again (S17).

In a case where there is an input for causing image capture to be carried out again (YES in S17), processing is repeated from image capture in S11. In a case where there is no input for causing image capture to be carried out again (NO in S1.7), identifier information for generating the normal PDF file is given to the captured image (S18a). In contrast, in a case where the result of the determination in S14 is that the captured image is suitable for generation of the compact PDF file (YES in S14), identifier information for generating the compact PDF file is given to the captured image (S15a).

Next, it is determined whether or not image capture has been completed (S19). In a case where image capture has not been completed (NO in S19), the processing is repeated from S11. In a case where image capture has been completed (YES in S19), thumbnails of a plurality of captured images are displayed (S20). In a case where a large number of images have been captured, the images are sequentially displayed in groups of, for example, three in, for example, an order in which the images were captured. In this case, the images are displayed together with their respective pieces of the identifier information given in S15a or S18a (S21). According to Embodiment 1, a result of the determination of whether or not to generate the compact PDF file is displayed as the identifier information. For a captured image which is not suitable for generation of the compact PDF file as a result of the determination, a message that the captured image is not suitable for generation of the compact PDF file is displayed so that the user is notified of the message. For a captured image which is suitable for generation of the compact PDF file, no message needs to be displayed.

Then, it is determined whether or not an instruction for modification in identifier has been inputted (described later) (S22). In a case where the instruction for modification in identifier has been inputted (YES in S22), the identifier information is modified (identifier modification processing is carried out) (S23), and the processing is repeated from S20. In a case where no instruction for modification in identifier has been inputted (NO in S22), the PDF file in accordance with the identifier information is generated (S24).

Figure 10:
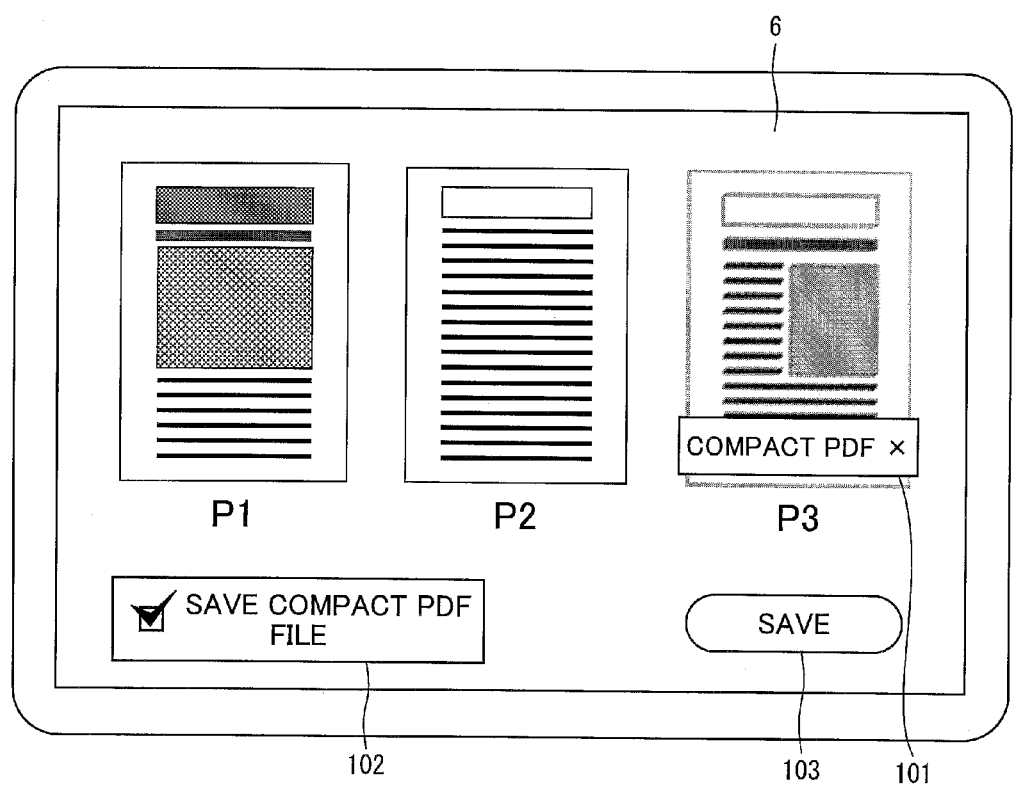
FIG. 10 shows a display example in which a plurality of captured images are preview-displayed.

FIG. 10 shows a display example of the display on the display section 6 in S20 and S21. FIG. 10 is the display example of the case of prompting the user to enter an input as to whether or not to save captured images in the compact PDF file. According to the display example of FIG. 10, thumbnail images P1 through P3 of the captured images are displayed. For a thumbnail image which is not suitable for generation of the compact PDF file, a message 101 of "compact PDF x" is displayed. For a thumbnail image which is suitable for generation of the compact PDF file, no message is displayed. Note that the message 101 of "compact PDF x" may be replaced with a message of, for example, "not suitable to be in a compact PDF format". Meanwhile, for the thumbnail image which is suitable for generation of the compact PDF file, a message of, for example, "suitable to be in a compact PDF format" may be displayed.

According to the display example shown in FIG. 10, it is notified by the message 101 of "compact PDF x" that saving of the captured images in the compact PDF file may cause a deterioration in image quality. The user who does not care about the deterioration in image quality places a checkmark in a checkbox provided in a region 102 for giving an instruction to save the captured images in the compact PDF file. By placing the checkmark in the checkbox, the user inputs the instruction to save the captured images in the compact PDF file.

In a case where the user has inputted the instruction to save the captured images in the compact PDF file, all the captured images corresponding to the thumbnail images P1 through P3 are saved in the compact PDF file. The saving can be carried out by pressing a save button 103 shown in FIG. 10. In a case where the saving of the captured images in the compact PDF file is not selected, the captured images corresponding to the thumbnail images P1 and P2 are saved in the compact PDF file, and the captured image corresponding to the thumbnail image P3 is saved in the normal PDF file.

Figure 11:
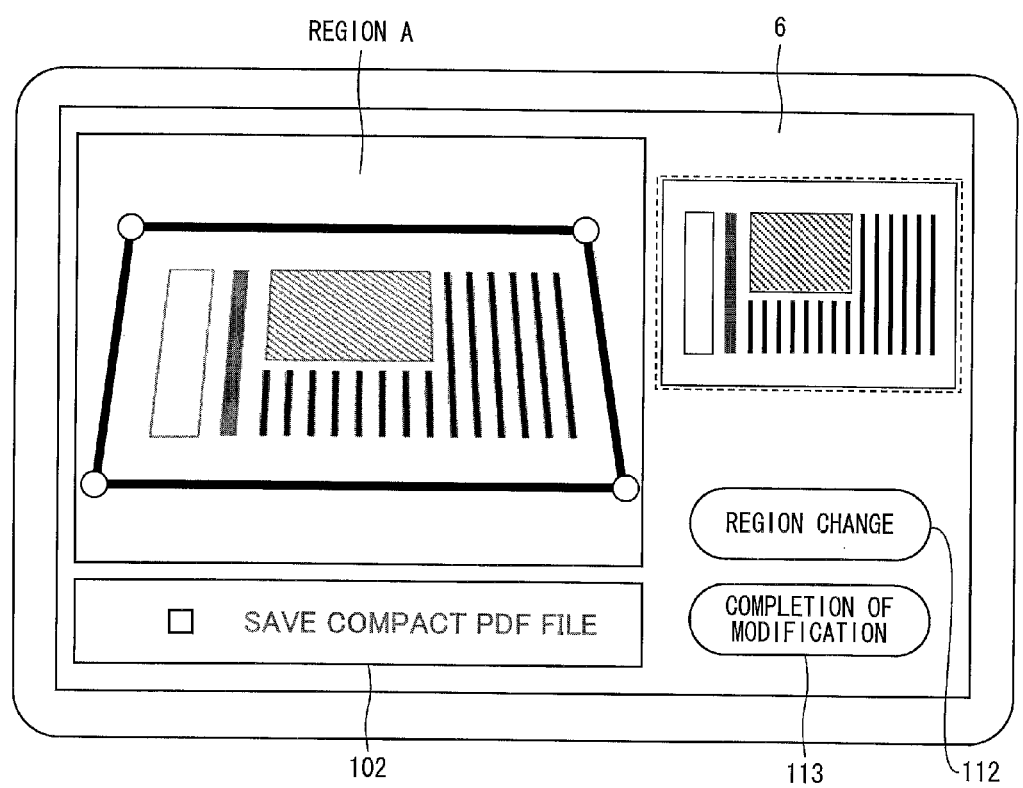
FIG. 11 shows an example of an adjustment screen for adjusting a captured image.

According to the above description, it is displayed whether or not to save the captured images in the compact PDF file. Alternatively, it is possible to display an initial setting menu screen and to set therein, as an initial setting value, whether or not to save the captured images in the compact PDF file. In a case where it is not displayed whether or not to save the captured images in the compact PDF file, a correction screen as shown in FIG. 11 is displayed. The region 102 for giving the instruction to save the captured images in the compact PDF file is grayout-displayed in FIG. 11.

In a case where one of the thumbnail images P1 through P3 shown in FIG. 10 is selected (e.g., in a case where the screen is touched by the user with a finger), an adjustment screen (see FIG. 11) for adjusting a region of a document is displayed. In a case where the selected thumbnail image corresponds to the captured image for which it has been determined that the captured image is not suitable for generation of the compact PDF file, the region 102 for giving the instruction to save the captured images in the compact PDF file is grayout-displayed with no checkmark placed in a checkbox. In a case where the user has determined that the captured image may be saved in the compact PDF file and the user touches the grayout-displayed region 102, a checkmark is placed in the checkbox. By placing the checkmark in the checkbox, the user inputs the instruction to save the captured image in the compact PDF file. Then, the saving of the captured images in the compact PDF file is made effective by pressing a modification completion button 113 displayed in the adjustment screen.

In a case where the above operation is carried out, it is possible to carry out processing for modifying a file format in which each of the captured images is saved (identifier modification processing). In a case where the captured images are saved in the file format which has not been modified, pressing of the modification completion button 113 resets the adjustment screen to the screen in which the thumbnail images shown in FIG. 10 are displayed.

Next, the following description will explain a region change button 112 displayed in the adjustment screen illustrated in FIG. 11. In a case where the region change button 112 is configured to receive an input of an instruction to edit coordinates of four vertexes which coordinates are found by the geometry distortion correction section 11 and to generate a captured image corrected based on an image of a region surrounded by a contour connecting the edited coordinates of the four vertexes, it is possible to provide a function of carrying out document region adjustment processing (region change) for adjusting a region of a document.

For example, the display control section 17 causes four vertex icons corresponding to respective four vertexes to be displayed in a region A of the adjustment screen (see FIG. 11). Then, the display control section 17 receives an input of an instruction to change positions of the respective four vertex icons, and edits coordinates of the four vertexes in accordance with the changed positions of the respective four vertex icons so as to determine a position of a contour. This allows a region change by a change in coordinate of the four vertexes. In a case where a document is extracted from a captured image, a background may be extracted by being erroneously recognized as the document, or a contour of the document may be inaccurately extracted. In such a case, a region of the document to be extracted can be adjusted in a case where the user presses the region change button 112 so as to control the positions of the four vertexes.

The above example is an example in which a region of a document is adjusted with respect to images captured by the multi-shot. Alternatively, by displaying the adjustment screen as illustrated in FIG. 11, a region of a document may be adjusted, in processing for the single shot, with respect to a captured image for which it has been determined that the captured image is not suitable for generation of the compact PDF file.

The feature extracting section 19, the captured image determining section 16, and the notification section 18 (which are described above) constitute a determining section (determining apparatus) 20 which determines whether or not a captured image is suitable for generation of a compact PDF file.

1-4. Detection of Brightness, Contrast, and Color Balance

The mobile terminal apparatus 1 may be configured not only to determine whether or not a captured image is suitable for generation of a compact PDF file (described earlier) but also to detect brightness, contrast, and color balance of the captured image.

In the case of detecting brightness, it is possible to determine, for example, overexposure (too bright) or underexposure (too dark). Such a case where overexposure or underexposure is determined requires capturing an image again. The determination of overexposure or underexposure can be carried out by, for example, the following method. According to the method, for example, the maximum value and the minimum value of pixel values of a captured image are calculated, and when the maximum value is not more than a certain threshold (e.g. 100 in 8 bit), it is determined that the captured image is underexposure, and when the minimum value is not less than a certain threshold (e.g. 150 in 8 bit), it is determined that the captured image is overexposure.

In the case of detecting contrast, when a difference between the maximum value and the minimum value (which are mentioned above) is not more than a predetermined threshold, it can be determined that the captured image does not have a sufficient contrast. This detection may be carried out with respect to each color channel, or may be carried out by use of an average value ((R+G+B)/3) or a brightness value ($0.299 \times R + 0.587 \times G + 0.114 \times B$: in compliance with NTSC).

In the case of detecting color balance, it is determined that a certain channel has excessive deviations by comparison of an average value, the maximum value, and the minimum value of each color channel (RGB). For example, the determination can be carried out by, for example, the following method. According to the method, for example, an average value (Ra, Ga, Ba) of values of individual color channels of a pixel whose brightness is equal to or close to the maximum brightness (maximum brightness to maximum brightness—5 or so) in an image is calculated, and in a case where a difference between the maximum value and the minimum value of each color channel is not less than a certain value [Max (Ra, Ga, Ba)−Min (Ra, Ga, Ba)>0.1× Max (Ra, Ga, Ba)], the determination is carried out.

Figure 14:
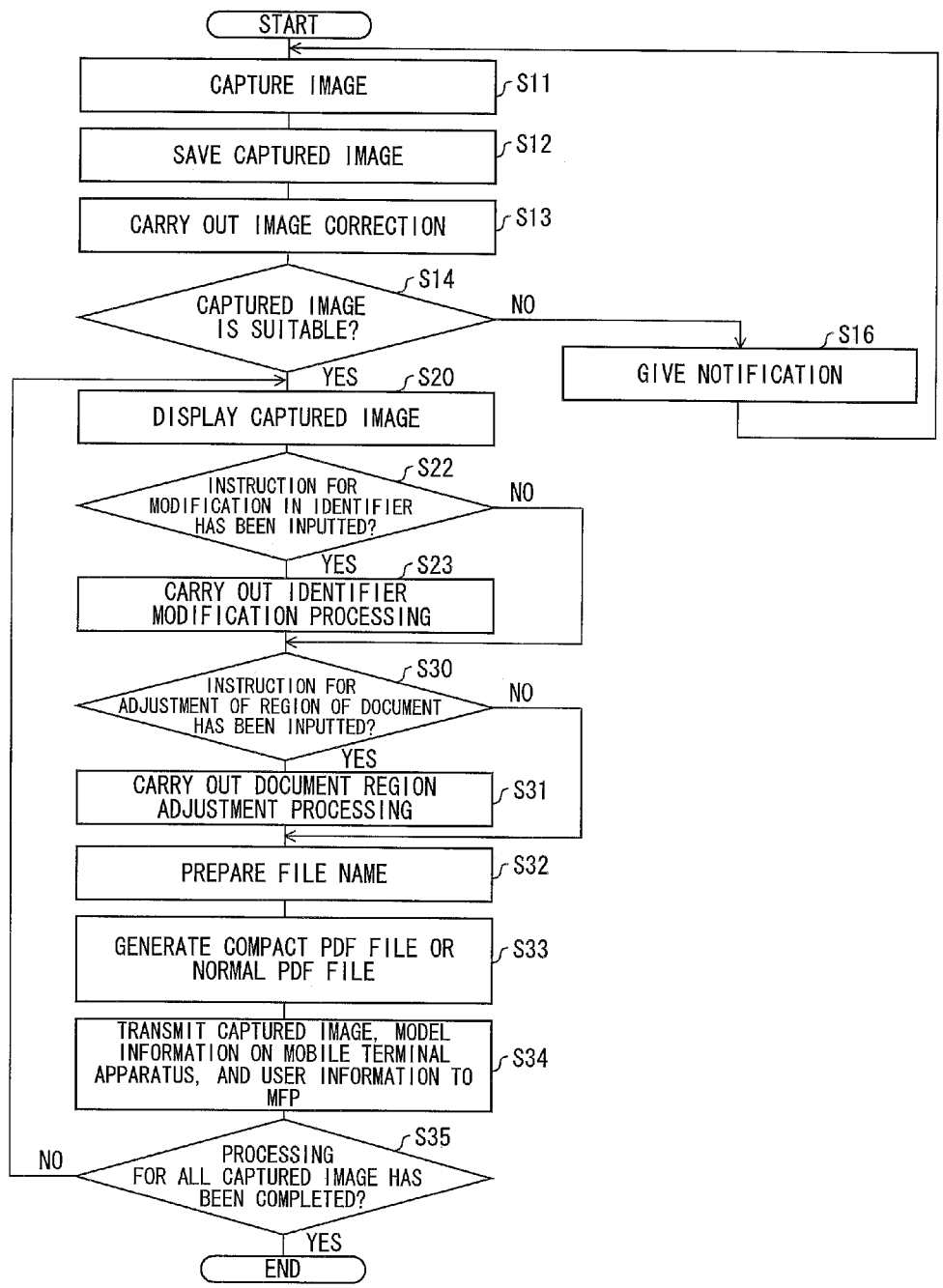
FIG. 14 is a flow chart showing a flow of processing carried out by the mobile terminal apparatus after images are captured.

2. Flow of Processing Carried Out by Mobile Terminal Apparatus after Image Capture The following will explain, with reference to FIG. 14, a flow of processing carried out by the mobile terminal apparatus 1 after the images are captured by the multi-shot.

In a case where image capture is carried out (S11), a captured image is saved in the storage section 3 (S12) and is subjected to an image correction including a geometry distortion correction (S13). Next, it is determined whether or not the captured image is suitable for generation of a compact PDF file (S14). In a case where a result of the determination is that the captured image is not suitable for generation of the compact PDF file (NO in S14), notification is given on the display section 6 (S16). In a case where recapture of an image is selected, processing is repeated from S11. In a case where the result of the determination is that the captured image is suitable for generation of the compact PDF file (YES in S14), the captured image is displayed on the display section 6 (S20).

Next, as described earlier, it is determined whether or not an instruction for modification in identifier has been inputted (S22). In a case where the instruction for modification in identifier has been inputted (YES in S22), the identifier modification processing is carried out (S23). In a case where no instruction for modification in identifier has been inputted (NO in S22), the processing directly proceeds to the next step. Subsequently, it is determined whether or not an instruction for adjustment of a region of a document has been inputted (S30). In a case where the instruction for adjustment of the region of the document has been inputted (YES in S30), the document region adjustment processing (described earlier) is carried out with respect to the region whose adjustment has been instructed (S31). In a case where no instruction for adjustment of the region of the document has been inputted, the processing directly proceeds to the next step.

Then, a file name is prepared (S32). The file name may be automatically prepared by use of date and time information and/or the total number of pages. Alternatively, it is possible to receive preparation of the file name by the user. In a case where no instruction for adjustment of the region of the document has been inputted (NO in S30), the processing directly proceeds to the step of preparing the file name (S32).

Thereafter, the captured image is converted into the compact PDF file or the normal PDF file (S33). Then, the captured image converted into the compact PDF file or the normal PDF file, model information on the mobile terminal apparatus, and user information are transmitted to the image forming apparatus 50 (S34). Note that the model information on the mobile terminal apparatus 1 is used to (i) carry out processing with respect to each terminal by which the image has been captured or (ii) change over a parameter. For example, the model information is used for, for example, an image quality adjusting section of a second image processing section 61 of the image forming apparatus 50 to change over a parameter (described later).

It is then determined whether or not processing for all the captured images has been completed (S35). In a case where the processing for all the captured images has not been completed (NO in S35), the processing is repeated from S20.

Processing carried out during the transmission in S34 is specifically described here. In a case where an instruction is inputted from the input section 7, which instruction instructs the image forming apparatus 50 to output the captured image which has been converted into the compact PDF file or the normal PDF file, the control section 2 controls the display section 6 to display a screen prompting the user to input (i) an instruction to select a type of output processing carried out by the image forming apparatus 50 (e.g. printing processing, filing processing, and e-mail sending processing) and (ii) a setting condition (e.g. a printing condition such as the number of printing, an address of a server to which filing is to be carried out, and an e-mail destination address) for carrying out selected output processing. Then, the control section 2 obtains, from the input section 7, setting information indicative of the type of output processing and the setting condition for the output processing. In a case where a transmission instruction is entered from the input section 7, the control section 2 controls the communication section 5 to carry out transmitting processing in which the captured image which has been converted into the compact PDF file or the normal PDF file is transmitted to the image forming apparatus 50. In doing so, the communication section 5 transmits, to the image forming apparatus 50, the setting information associated with the captured image, together with (i) the captured image which has been converted into the compact PDF file or the normal PDF file, (ii) model information on the mobile terminal apparatus 1 and (iii) user information which are stored in the storage section 3.

The above is all the description of the processing carried out by the mobile terminal apparatus 1 after image capture.

According to Embodiment 1, the compact PDF file or the normal PDF file generated by the mobile terminal apparatus 1 as described earlier is transmitted to the image forming apparatus 50 for output processing. In this case, when an address of the image forming apparatus 50, which is a destination to which the compact PDF file or the normal PDF file is to be transmitted, is set (an address stored in the storage section 3 is selected or an address is directly inputted), the compact PDF file or the normal PDF file is transmitted from the communication section 5 to the image forming apparatus 50. Examples of output processing carried out by the image forming apparatus 50 encompass printing processing of printing/outputting the compact PDF file or the normal PDF file, filing processing of storing the compact PDF file or the normal PDF file in a storage apparatus such as a server apparatus or a USB memory, and e-mail sending processing of sending an e-mail to which the compact PDF file or the normal PDF file is attached. Alternatively, the compact PDF file or the normal PDF file generated by the mobile terminal apparatus 1 may be transmitted to, for example, a server apparatus or an image display apparatus.

3. Image Forming Apparatus

The following description will explain configuration of the image forming apparatus 50. According to Embodiment 1, the image forming apparatus 50 is a multifunction printer (MFP) that has functions of a scanner, a printer, a copying machine, and the like. Examples of the output processing carried out by the image forming apparatus 50 encompass printing, facsimile transmission, image transmission such as e-mail, and filing.

Figure 15:
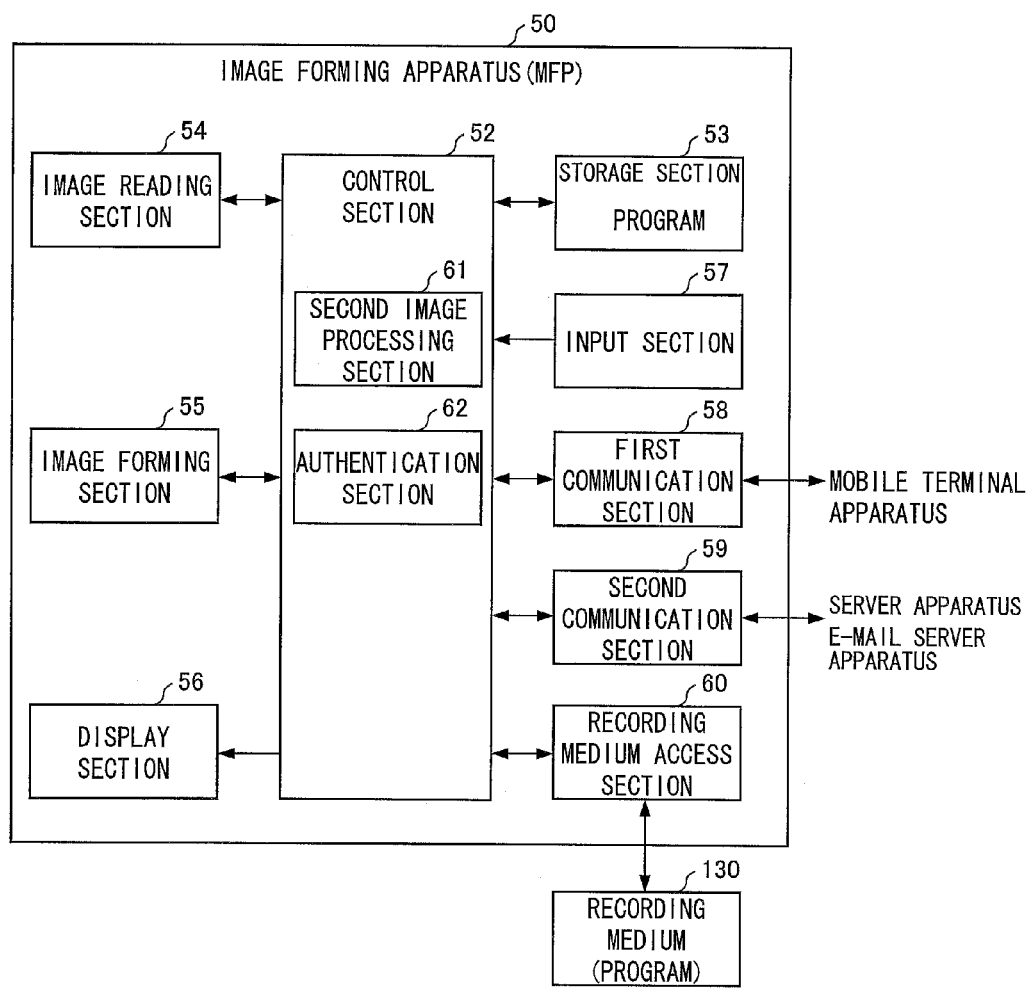
FIG. 15 is a block diagram illustrating a configuration of an image forming apparatus of an embodiment of the present invention.

FIG. 15 is a block diagram illustrating a configuration of the image forming apparatus 50. The image forming apparatus 50 includes a control section 52, a storage section 53, an image reading section 54, an image forming section 55, a display section 56, an input section 57, a first communication section 58, a second communication section 59, and a recording medium access section 60 (see FIG. 15).

The control section 52 comprehensively controls each block of the image forming apparatus 50. The control section 52 functions as (i) the second image processing section 61 which carries out given image processing with respect to received image data and (ii) an authentication section 62. The second image processing section 61 will be later described.

The authenticating section 62 authenticates a user before the processing, in which the captured image received from the mobile terminal apparatus 1 is outputted, is carried out. Specifically, the authenticating section 62 authenticates a user by comparing (i) the user information received from the mobile terminal apparatus 1 and (ii) user information (user ID and password) inputted from the input section 57.

The storage section 53 stores various types of programs, various types of data, and the like which are used by the image forming apparatus 50.

The image reading section (scanner) 54 is a block which reads a document. The image reading section 54 includes a CCD (Charge Coupled Device). The image reading section 54 converts light reflected from document into R, G and B electrical signals (analog image signals), and outputs them.

The image forming section 55 is a block which forms an image on a recording sheet such as a paper with the use of a method such as an electrophotographic printing method or an inkjet method. That is, the image forming section 55 is a block which carries out, as one of the output processing, printing processing in which an image represented by the corrected image data is printed onto a recording paper such as a sheet.

The display section 56 is a block which is realized by, for example, a liquid crystal display or the like and displays various types of images and various types of information. The input section 57 has a plurality of buttons by which a user enters a data input etc. A touch panel can be provided in which the display section 56 and the input section 57 are integrated with each other.

According to Embodiment 1, the first communication section 58 has a serial transfer/parallel transfer function based on USB (Universal Serial Bus) 1.1 or USB 2.0 and a wireless data communication function. The first communication section 58 receives, from the mobile terminal apparatus 1, image data to which the setting information is added.

The second communication section 59 has functions of (a) data communication utilizing a wireless technique based on any one of IEEE802.11a, IEEE802.11b, and IEEE802.11g, each of which is a standard of wireless LAN, (b) data communication, via a LAN cable, with a network having a function of a communication interface utilizing Ethernet (Registered Trademark), and (c) data communication utilizing a wireless technique based on any one of IEEE802.15.1 (so-called Bluetooth (Registered Trademark)), an infrared communication standard such as IrSimple, and a communication method such as Felica (Registered Trademark), each of which is a wireless communication standard.

The second communication section 59 carries out, as output processing, (i) filing processing in which image data, to which the predetermined image processing is carried out by the second image processing section 61, is stored in a server apparatus or (ii) e-mail sending processing in which an e-mail, to which the image data that has been subjected to the predetermined image processing is attached, is sent to an e-mail server apparatus.

The recording medium access section 60 is a block which reads out a program from a recording medium 130 in which the program is recorded.

3-1. Second Image Processing Section

The second image processing section 61 is a block which carries out given image processing with respect to the compact PDF file or the normal PDF file received from the mobile terminal apparatus 1 (hereinafter referred to as a received file).

Figure 16:
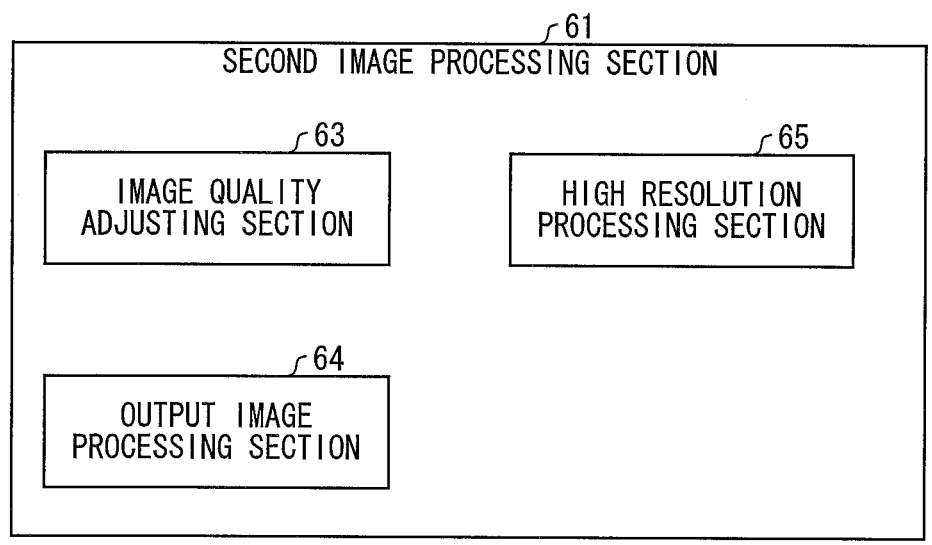
FIG. 16 is a block diagram illustrating a configuration of a second image processing section of the image forming apparatus.

The second image processing section 61 includes an image quality adjusting section 63, an output image processing section 64, and a high resolution processing section 65 (see FIG. 16).

The image quality adjusting section 63 is a block which corrects color balance, contrast, and brightness of a received file. An example of a method for correcting color balance and contrast is described here. Since the maximum value and the minimum value of each color channel are already known in the method carried out to detect color balance (described earlier), it is only necessary to create a look-up table in which the maximum value and the minimum value are made uniform, and to apply the look-up table to the each color channel. It is only necessary to create, as the look-up table, a table in which MN is increased by increments of (MX−MN)/255 where MX is a maximum value of a certain channel, MN is a minimum value of the channel, and image data is 8-bit data. FIG. 13 shows an example of such a look-up table. Contrast is corrected as in the case of the correction of color balance. Note that the look-up tables to be applied to respective color channels may be identical to each other if it is unnecessary to change the color balance.

The high resolution processing section 65 makes, on the basis of a received file to be outputted, a high resolution correction with respect to the received file to be outputted. As for a method of creating a high-resolution image from a single image, some methods have been introduced in Journal of the Institute of Image Information and Television Engineers Vol. 62, No. 2, pp. 181-189 (2008). Typically, the following processing (i) and (ii) are carried out: (i) edge direction interpolation processing in which an edge direction of an image pattern is detected and estimated and interpolation is carried out in accordance with the direction; and (ii) image quality improving processing in which influence of distortion caused by the interpolation and a noise component present in an input image, etc. are removed.

The output image processing section 64 is a block which carries out output processing such as a segmentation process, a color correction process, a black generation and under color removal process, a spatial filter process, and a halftone process, in a case where the received file is subjected to outputting (e.g., printing, facsimile transmitting, image transmitting such as e-mail, and filing).

In a case where filing and e-mail sending are carried out in the image forming apparatus 50, it is possible to convert, into the compact PDF file, image data read by a scanner or image data received from the mobile terminal apparatus 1 and being in a format different from the compact PDF file or the normal PDF file (e.g., image data in a JPEG format). Further, it is also possible to generate a searchable PDF file to which a result of text recognition is attached in a form of a transparent text by carrying out OCR. Alternatively, it is possible to attach, to the compact PDF file or the normal PDF file received from the mobile terminal apparatus 1, the result of text recognition in the form of the transparent text by carrying out OCR.

As described earlier, the compact PDF file or the normal PDF file generated by the mobile terminal apparatus 1 as described earlier may be transmitted to the image display apparatus (display) (not illustrated) or the server apparatus (not illustrated), and the processing carried out by the image forming apparatus 50 (described earlier) may be carried out by the image display apparatus or the server apparatus. In this case, according to the image forming apparatus 50 illustrated in FIG. 15, the image display apparatus or the server apparatus is configured to include neither the image reading section 54 nor the image forming section 55. Further, in this case, the second image processing section 61 includes, for example, an image quality adjusting section, a high resolution processing section, a color correcting section, and a spatial filter processing section. Note that the second image processing section 61 does not need to include an authenticating section and the high resolution processing section.

4. Processing Flow in Image Processing System

Figure 17:
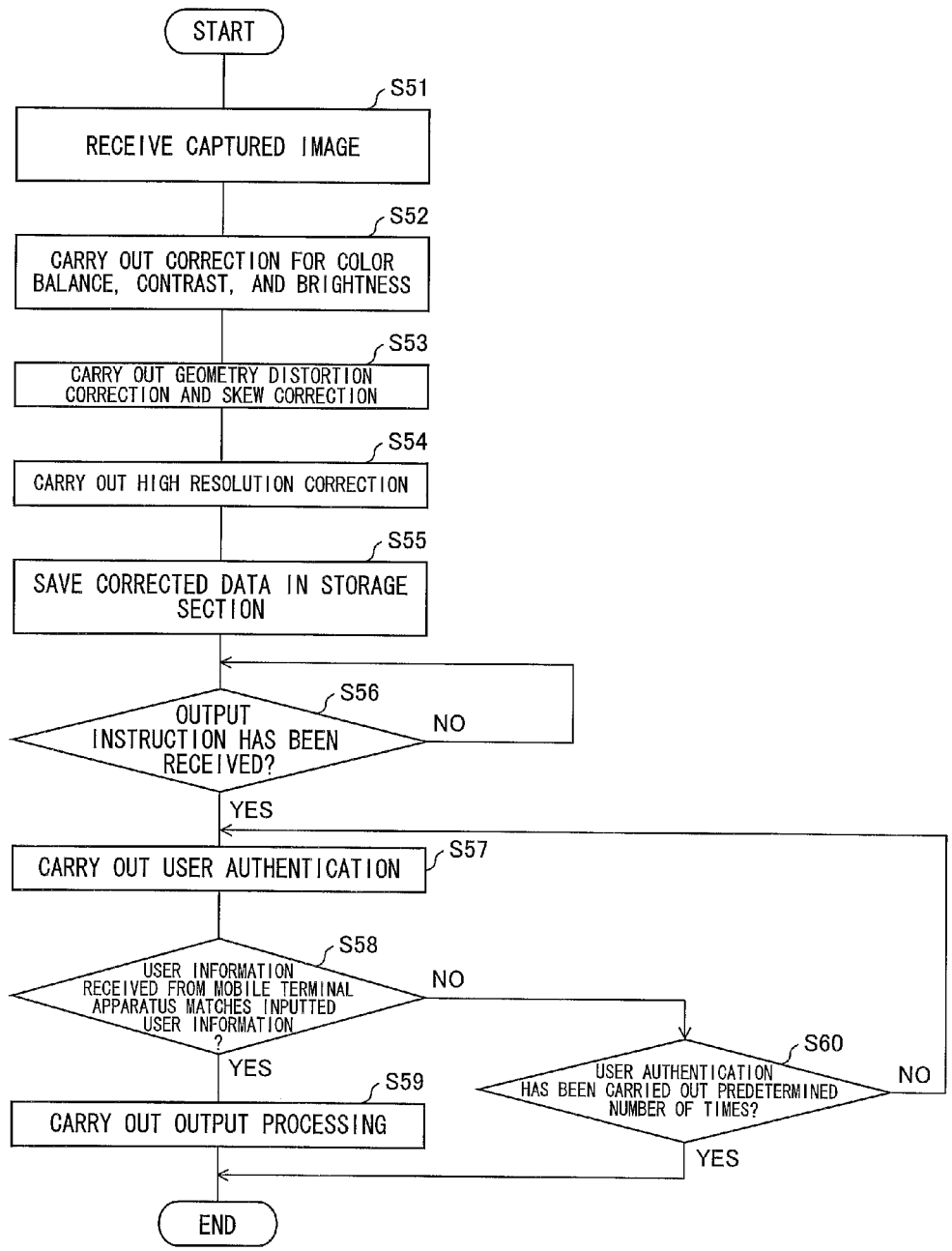
FIG. 17 is a flow chart showing a flow of processing carried out by the image forming apparatus.

The following description will explain, with reference to FIG. 17, a flow of processing carried out by the image forming apparatus 50. Particularly in a case where a JPEG file is embedded in the compact PDF file or the normal PDF file received from the mobile terminal apparatus 1, the processing to be explained below can be carried out by extracting the JPEG file, or converting the compact PDF file or the normal PDF file into bitmap data.

Upon receipt of the compact PDF file or the normal PDF file from the mobile terminal apparatus 1 (S51), in accordance with a user setting, the image forming apparatus 50 subjects the received file to a correction for color balance, contrast, and brightness (S52), a geometry distortion correction and a skew correction (S53), and a high resolution correction (S54), and the image forming apparatus 50 saves, in the storage section 53, the received file which has been subjected to these corrections (S55). Then, the image forming apparatus 50 determines whether or not an output instruction has been received (S56). In a case where the output instruction has been received (YES in S56), the image forming apparatus 50 carries out user authentication (S57). Next, the image forming apparatus 50 determines, in the user authentication, whether or not the user information received from the mobile terminal apparatus 1 matches the inputted user information (S58). In a case where the user information received from the mobile terminal apparatus 1 matches the inputted user information (YES in S58), the image forming apparatus 50 carries out output processing in accordance with the user setting (S59). In a case where the user information received from the mobile terminal apparatus 1 does not match the inputted user information (NO in S58), the image forming apparatus 50 determines whether or not the number of times of the user authentication is a predetermined number (S60). In a case where the number of times of the user authentication is not the predetermined number (NO in S60), the image forming apparatus 50 repeats the processing from S57. In a case where the number of times of the user authentication is the predetermined number (YES in S60), the image forming apparatus 50 ends the processing.

In this manner, the processing carried out by image forming apparatus 50 is completed. Note that the processing of each of S52 and S53 in FIG. 17 is carried out so that the image display apparatus displays the received file from the mobile terminal apparatus 1. The high resolution correction of S54 may also be carried out according to need.

[Embodiment 2]

According to Embodiment 1, the determining section 20 is included in the mobile terminal apparatus 1. Note, however, that Embodiment 2 deals with a configuration in which the determining section 20 is included in the image forming apparatus 50. That is, according to Embodiment 2, the image forming apparatus 50 functions as the determining apparatus of the present invention. In this case, the determining section 20 is not provided in the mobile terminal apparatus 1. Note that members which have functions identical with those shown in the drawings used in the explanation of Embodiment 1 are given identical reference numerals, and are not described in detail repeatedly.

According to the image forming apparatus 50 of Embodiment 2, the determining section 20 is provided in the control section 52. The determining section 20 determines whether or not it is necessary to generate the compact PDF file for the captured image received from the mobile terminal apparatus 1, and returns a result of the determination to the mobile terminal apparatus. Accordingly, the first communication section 58 functions as the notification section 18. Alternatively, the result of the determination may be displayed on the display section 56 of the image forming apparatus 50. In this case, the mobile terminal apparatus 1 causes the file generation section 12 to generate the compact PDF file or the normal PDF file in accordance with the received result of the determination.

Further, the image forming apparatus 50 (which can be replaced with image display apparatus or the server apparatus) may be configured to carry out a geometry distortion correction, image quality adjusting processing, high resolution processing, and output image processing, and to generate the compact PDF file or the normal PDF file so as to return the compact PDF file or the normal PDF file to the mobile terminal apparatus 1. In this case, the file generation section 12 is provided in the image forming apparatus 50 but is not provided in the mobile terminal apparatus 1. Accordingly, in this case, the mobile terminal apparatus 1 generates, for example, the captured image and a processing condition, and transmits, to the image forming apparatus 50, the captured image and various types of information (e.g., geometry distortion correction information, model information on the mobile terminal apparatus 1, user information, and information on the processing condition). Note here that the geometry distortion correction information is information on the aforementioned coordinates of the four intersections. The image forming apparatus 50 uses received data to carry out each processing mentioned above, and to generate the compact PDF file or the normal PDF file.

Alternatively, the image forming apparatus 50 may be configured to receive, from the mobile terminal apparatus 1, not only the captured image and the various types of information but also an address of a destination to which the captured image is to be transmitted, to generate the compact PDF file or the normal PDF file by carrying out the each processing, and to transmit the compact PDF file or the normal PDF file to the address of the destination.

According to Embodiment 2, the determining section 20, which is provided in the image forming apparatus 50, makes it possible to reduce a load to the mobile terminal apparatus 1.

Embodiment 2 has dealt with the configuration in which the determining section 20 is included in the image forming apparatus 50. Note, however, that the determining section 20 may be provided to another device such as the image display apparatus or the server apparatus.

[Embodiment 3]

The mobile terminal apparatuses 1 and the image forming apparatus 50 each may be realized by (i) a logic circuit (hardware) provided in an integrated circuit (IC chip) or the like or (ii) software executed by a CPU (Central Processing Unit).

In the latter case (ii), the mobile terminal apparatuses 1 and the image forming apparatus 50 each include: a CPU that executes instructions of a program that is software realizing the foregoing functions; ROM (Read Only Memory) or a storage apparatus (each referred to as "recording medium") storing the program and various kinds of data in such a form that they are readable by a computer (or a CPU); and RAM (Random Access Memory) in which the program is loaded in executable form. The object of the present invention can be achieved by a computer (or a CPU) reading and executing the program stored in the recording medium. "A non-transitory tangible medium" can be employed as the recording medium. Examples of the non-transitory tangible medium encompass a tape, a disk, a card, a semiconductor memory, and a programmable logic circuit.

The program may be supplied to or made available to the computer, via any transmission medium (such as a communication network or a broadcast wave) which enables transmission of the program. Note that the present invention can also be implemented by the program in the form of a computer data signal embedded in a carrier wave which is embodied by electronic transmission.

The present invention is not limited to the description of the embodiments above, but may be altered by a skilled person. That is, an embodiment based on a combination of technical means properly altered within the scope of the gist of the present invention is encompassed in the technical scope of the present invention.

CONCLUSION

A determining apparatus (determining section 20) of Aspect 1 of the present invention includes: a feature extracting section (19) configured to extract, as a feature from at least one captured image captured by an image-capturing apparatus, at least one piece of information on the at least one captured image out of (i) a piece of information on a blur, (ii) a piece of information on a skew, and (iii) a piece of information on an image type; and a captured image determining section (16) configured to determine whether or not the at least one captured image is suitable for conversion into a compressed image in a platform independent file format, by determining whether or not the feature extracted by the feature extracting section satisfies a given condition.

According to the configuration, the determining apparatus determines whether or not the at least one captured image is suitable for conversion into (generation of) a compressed image in a platform independent file format (e.g., a compact PDF file). This makes it possible to prevent in advance a deterioration in image quality which deterioration is caused by converting, into the compressed image in the platform independent file format, the at least one captured image which is not suitable for conversion into the compressed image in the platform independent file format. Suitability for the conversion is determined in accordance with the piece of information on the at least one captured image out of the piece of information on a blur, the piece of information on a skew, and the piece of information on an image type, the information having been extracted from the at least one captured image. Therefore, the determination can be suitably carried out.

The determining apparatus having the configuration may be provided in the image-capturing apparatus (e.g., a mobile terminal apparatus), or may be provided in an apparatus different from the image-capturing apparatus (e.g., a server apparatus, an image forming apparatus, or an image display apparatus). The determining apparatus which is provided in the apparatus different from the image-capturing apparatus can determine suitability for the conversion without applying any load to the image-capturing apparatus. In this case, the apparatus different from the image-capturing apparatus may receive the at least one captured image from the image-capturing apparatus and transmit a result of the determination to the image-capturing apparatus. Further, the apparatus different from the image-capturing apparatus may be configured to carry out, for example, a geometry distortion correction, image quality adjusting processing, high resolution processing, and output image processing in addition to determination of suitability for the conversion, and to convert the at least one captured image into an image in a given platform independent file format (e.g., generate a compact PDF file or a normal PDF file) and return the compact PDF file or the normal PDF file to the image-capturing apparatus.

The determining apparatus of Aspect 2 of the present invention may be configured to further include a notification section (display control section 17, notification section 18) configured to notify a result of the determination by the captured image determining section.

The configuration makes it possible to notify a user of the result of the determination by the captured image determining section. Accordingly, in a case where the at least one captured image is not suitable for conversion into the compressed image in the platform independent file format and the user knows this fact in advance, it is possible to, for example, convert the at least one captured image into an image in another platform independent file format instead of the conversion into the compressed image in the platform independent file format, so that obtainment of lower image quality can be prevented.

Note that the notification may be given in any form such as a display, a voice, or lighting, provided that the form makes it possible to notify the user of the result of the determination of whether or not the at least one captured image is suitable for conversion into the compressed image in the platform independent file format.

A mobile terminal apparatus (1) of Aspect 3 of the present invention includes: a communication section (5) configured to carry out communication with an external device; the determining apparatus mentioned in Aspect 1 or 2; and an image-capturing section (4) configured to capture an object and function as the image-capturing apparatus, the communication section transmitting, to the external device, the at least one captured image captured by the image-capturing section and the result of the determination by the captured image determining section for the at least one captured image, the external device converting the at least one captured image into an image in a given platform independent file format in accordance with the result of the determination by the captured image determining section.

The configuration allows the mobile terminal apparatus to determine whether or not a captured image captured by the mobile terminal apparatus is suitable for conversion into the compressed image in the platform independent file format. The mobile terminal apparatus can capture the object in various scenes while being literally carried by the user. Therefore, in a case where such a mobile terminal apparatus is configured to be provided with the determining apparatus (described earlier), it is possible to carry out the determination of suitability for the conversion with respect to the captured image captured by the mobile terminal apparatus, so that the mobile terminal apparatus having the configuration is favorable. As described earlier, it is possible to provide a user-friendly mobile terminal apparatus.

Further, since the external device converts the at least one captured image into the image in the given platform independent file format, it is possible to reduce a load to the mobile terminal apparatus. Note here that the external device converting the at least one captured image into the image in the given platform independent file format in accordance with the result of the determination by the captured image determining section is exemplified by, but not limited to an image forming apparatus, an image display apparatus, and a server apparatus.

A mobile terminal apparatus of Aspect 4 of the present invention includes: a communication section configured to carry out communication with an external device; the determining apparatus mentioned in Aspect 1 or 2; an image-capturing section configured to capture an object and function as the image-capturing apparatus; and a file generation section (12) configured to convert the at least one captured image into an image in a given platform independent file format in accordance with the result of the determination by the captured image determining section, the communication section transmitting, to the external device, the image into which the at least one captured image has been converted by the file generation section, the external device carrying out output processing with respect to the image.

The configuration allows the mobile terminal apparatus to convert a captured image captured by the mobile terminal apparatus into the image in the given platform independent file format in accordance with suitability for conversion into the compressed image in the platform independent file format. The mobile terminal apparatus can capture the object in various scenes while being literally carried by the user. Therefore, it is possible to carry out the determination of suitability for the conversion with respect to the captured image captured by the mobile terminal apparatus, so that the mobile terminal apparatus having the configuration is favorable. Further, the external device can carry out output processing by use of the image in the given platform independent file format into which image the captured image has been converted and which image is transmitted to the external device. As described earlier, it is possible to provide a user-friendly mobile terminal apparatus.

Note here that the external device which carries out output processing with respect to the image into which the at least one captured image has been converted by the file generation section may be, for example, an image forming apparatus. In this case, output processing may be printing processing of printing/outputting the image thus obtained by the conversion by the file generation section, filing processing of storing the image in a storage apparatus such as a server apparatus or a USB memory, or e-mail sending processing of sending an e-mail to which the image is attached. In this case, output processing may be transmitting processing in which the image obtained by the conversion by the file generation section is transmitted to another mobile terminal apparatus. Note that these are merely taken as examples of the configurations of the external device and output processing. The external device may be a device different from that described above, or output processing may be processing different from that described above.

The mobile terminal apparatus of Aspect 5 of the present invention is configured to further include: a display section (6); a display control section (17) configured to cause the display section to display the at least one captured image; and an input section (7) configured to receive an input by a user, every time the image-capturing section carries out image capture, the display control section causing the display section to display the at least one captured image captured by the image-capturing section and the result of the determination by the captured image determining section for the at least one captured image, and in a case where the result of the determination by the captured image determining section is that the at least one captured image is not suitable for conversion into the compressed image in the platform independent file format, the display control section causing the display section to display information for prompting the user to enter the input for causing the image-capturing section to carry out image capture again.

According to the configuration, in a case where the image-capturing section carries out image capture, it is possible to display the at least one captured image and display whether or not the at least one captured image is suitable for conversion into the compressed image in the platform independent file format. In a case where the at least one captured image is not suitable for the conversion, it is possible to notify the user of this fact by displaying information for prompting the image-capturing section to carry out image capture again. By capturing the object again, the user can enhance the possibility of obtaining an image which is suitable for conversion into the compressed image in the platform independent file format.

The mobile terminal apparatus of Aspect 6 of the present invention is configured to further include: a display section; a display control section configured to cause the display section to display the at least one captured image, the at least one captured image including a plurality of captured images; and an input section configured to receive an input by a user, the display control section causing the display section to display information that the at least one captured image, for which the captured image determining section has determined that the at least one captured image is not suitable for the conversion, is not suitable for the conversion, and the display control section further causing the display section to display information for prompting the user to enter the input as to whether or not to carry out the conversion with respect to the plurality of captured images displayed on the display section.

According to the configuration, for a captured image which is not suitable for the conversion and is included in the plurality of captured images, information that the captured image is not suitable for the conversion is displayed, and information for causing the user to enter the input as to whether or not to carry out the conversion with respect to the plurality of captured images is further displayed. This allows the user to select whether or not to convert the displayed plurality of captured images into the compressed image in the platform independent file format. By entering, from the input section, the input as to whether or not to carry out the conversion, the user can reflect the user's intention.

The mobile terminal apparatus of Aspect 7 of the present invention is configured to further include: a display section; a display control section configured to cause the display section to display the at least one captured image, the at least one captured image including a plurality of captured images; and an input section configured to receive an input by a user, when the input section receives the input for selecting a captured image from the plurality of captured images displayed on the display section, the display control section causing the display section to display, for the selected captured image, (i) information that the selected captured image is not suitable for the conversion, and (ii) information for prompting the user to enter the input as to whether or not to carry out the conversion with respect to the selected captured image.

According to the configuration, in a case where the captured image selected from the plurality of captured images is not suitable for the conversion, information that the captured image selected from the plurality of captured images is not suitable for the conversion is displayed, and information for causing the user to enter the input as to whether or not to carry out the conversion with respect to that captured image is further displayed. This allows the user to select whether or not to convert the selected captured image into the compressed image in the platform independent file format. By entering, from the input section, the input as to whether or not to carry out the conversion, the user can reflect the user's intention.

Note that the determining apparatus of Aspect 1 or 2, or the mobile terminal apparatus of any one of Aspects 3 through 7 may be realized by a computer. In this case, the present invention encompasses (i) a program which allows the determining apparatus or the mobile terminal apparatus to be realized by a computer by causing the computer to function as each section of the determining apparatus or the mobile terminal apparatus and (ii) a computer-readable recording medium in which the program is recorded.

INDUSTRIAL APPLICABILITY

The present invention is usable for, for example, a determining apparatus which determines whether or not a captured image is suitable for conversion into a compressed image in a platform independent file format, and a mobile terminal apparatus including the determining apparatus.

REFERENCE SIGNS LIST

1 Mobile terminal apparatus
2 Control section
4 Image-capturing section (image Capturing apparatus)
6 Display section
7 Input section.
12 File generation section
13 Blur detecting section
14 Document type discrimination section
15 Skew detecting section
16 Captured image determining section
17 Display control section
18 Notification section
19 Feature extracting section
20 Determining section (determining apparatus
61 Second image processing section

The invention claimed is:
1. A mobile terminal apparatus comprising:
communication circuitry that carries out communication with an external device;
a determining apparatus, including:
  feature extracting circuitry that extracts, as a feature from at least one captured image captured by an image-capturing apparatus, at least one piece of information on the at least one captured image out of (i) a piece of information on a blur, (ii) a piece of information on a skew, and (iii) piece of information on a image type; and
  captured image determining circuitry that determines whether or not the at least one captured image is suitable for conversion into a compressed image in a platform independent file format, by determining whether or not the feature extracted by the feature extracting circuitry satisfies a given condition;
image-capturing circuitry that captures an object and functions as the image-capturing apparatus;
file generation circuitry that converts the at least one captured image into an image in the platform independent file format in accordance with a result of the determination by the captured image determining circuitry;
a display;
display control circuitry that causes the display to display the at least one captured image, the at least one captured image including a plurality of captured images; and
input circuitry that receives an input by a user, wherein
the communication circuitry transmits, to the external device, the image into which the at least one captured image has been converted by the file generation cir- cuitry, the external device carrying out output processing with respect to the image; and the display control circuitry causes the display to display information that the at least one captured image, for which the captured image determining circuitry has determined that the at least one captured image is not suitable for the conversion, is not suitable for the conversion, and the display control circuitry further causing the display to display information to prompt the user to enter the input as to whether or not to carry out the conversion with respect to the plurality of captured images displayed on the display.

2. A mobile terminal apparatus, comprising:

communication circuitry that carries out communication with an external device;

a determining apparatus, including:

feature extracting circuitry that extracts, as a feature from at least one captured image captured by an image-capturing apparatus, at least one piece of information on the at least one captured image out of (i) a piece of information on a blur, (ii) a piece of information on a skew, and (iii) piece of information on an image type; and captured image determining circuitry that determines whether or not the at least one captured image is suitable for conversion into a compressed image in a platform independent file format, by determining whether or not the feature extracted by the feature extracting circuitry satisfies a given condition;

image-capturing circuitry that captures an object and functions as the image-capturing apparatus;

file generation circuitry that converts the at least one captured image into an image in a given platform independent file format in accordance with a result of the determination by the captured image determining circuitry;

a display;

display control circuitry that causes the display to display the at least one captured image, the at least one captured image including a plurality of captured images; and input circuitry that receives an input by a user, wherein the communication circuitry transmits, to the external device, the image into which the at least one captured image has been converted by the file generation circuitry, the external device carrying out output processing with respect to the image; and when the input circuitry receives the input for selecting a captured image from the plurality of captured images displayed on the display, the display control circuitry causes the display to display, for the selected captured image, (i) information that the selected captured image is not suitable for the conversion, and (ii) information for prompting the user to enter the input as to whether or not to carry out the conversion with respect to the selected captured image.

* * * * *